US012523354B2

(12) United States Patent
Park et al.

(10) Patent No.: US 12,523,354 B2
(45) Date of Patent: Jan. 13, 2026

(54) ULTRA-MICROLIGHT TRANSMISSION DEVICE USING SECONDARY ELECTRONS

(71) Applicant: BIOLIGHT CORP., Hanam-si (KR)

(72) Inventors: Mi Jung Park, Seoul (KR); Sang-Ik Yun, Seoul (KR); Haelim Jang, Gunpo-si (KR); Jeong Su Yang, Seongnam-si (KR); Seo Hyun Kim, Seoul (KR)

(73) Assignee: BIOLIGHT CORP., Hanam-si (KR)

( * ) Notice: Subject to any disclaimer, the term of this patent is extended or adjusted under 35 U.S.C. 154(b) by 0 days.

(21) Appl. No.: 18/713,987

(22) PCT Filed: Nov. 28, 2022

(86) PCT No.: PCT/KR2022/018925

§ 371 (c)(1),
(2) Date: Nov. 14, 2024

(87) PCT Pub. No.: WO2023/096436

PCT Pub. Date: Jun. 1, 2023

(65) Prior Publication Data

US 2025/0067416 A1 Feb. 27, 2025

(30) Foreign Application Priority Data

Nov. 26, 2021 (KR) ........................ 10-2021-0165848
Nov. 25, 2022 (KR) ........................ 10-2022-0160295

(51) Int. Cl.
*F21V 9/00* (2018.01)
*F21V 9/08* (2018.01)
*F21V 9/20* (2018.01)
*F21V 9/40* (2018.01)
*H01J 43/02* (2006.01)

(52) U.S. Cl.
CPC .................. *F21V 9/00* (2013.01); *F21V 9/08* (2013.01); *F21V 9/20* (2018.02); *F21V 9/40* (2018.02); *H01J 43/02* (2013.01)

(58) Field of Classification Search
CPC ................. F21V 9/08; F21V 9/20; F21V 9/40
See application file for complete search history.

(56) References Cited

FOREIGN PATENT DOCUMENTS

KR 10-1994-0007300 B1 8/1994
KR 20-1995-0000012 Y1 1/1995
(Continued)

OTHER PUBLICATIONS

International Search Report issued in PCT/KR2022/018925; mailed Mar. 24, 2023.

*Primary Examiner* — Sean P Gramling
(74) *Attorney, Agent, or Firm* — Studebaker Brackett PLLC

(57) ABSTRACT

Provides is an ultra-microlight transmission device using secondary electrons according to various embodiments of the present invention for implementing the above-objects. The ultra-microlight transmission device includes a light source module configured to generate light, a housing which includes an interior space and performs spectroscopy and diffuse reflection on light introduced into the interior space, a first filter unit configured to convert the spectroscopic and diffusely reflected light into monochromatic light, and a second filter unit configured to cause diffraction and interference for the converted light.

13 Claims, 11 Drawing Sheets

(56) References Cited

FOREIGN PATENT DOCUMENTS

| | | | | |
|---|---|---|---|---|
| KR | 10-2007-0080042 | A | | 8/2007 |
| KR | 20070080042 | A | * | 8/2007 |
| KR | 10-2008-0028040 | A | | 3/2008 |
| KR | 10-2012-0060097 | A | | 6/2012 |
| KR | 10-2019-0127223 | A | | 11/2019 |
| KR | 10-2020-0000483 | A | | 1/2020 |

* cited by examiner

ULTRA-MICROLIGHT TRANSMISSION DEVICE USING SECONDARY ELECTRONS

CROSS-REFERENCE TO RELATED APPLICATIONS

This application is the U.S. National Stage of International Application No. PCT/KR2022/018925 filed Nov. 28, 2022, which claims benefit of priority to Korean Patent Application No. 10-2022-0160295 filed Nov. 25, 2022, and Korean Patent Application No. 10-2021-0165848 filed Nov. 26, 2021, the entire content of which is incorporated herein by reference.

TECHNICAL FIELD

The present invention relates to an ultra-microlight transmission device, and more specifically, to a device which generates and provides ultra-microlight that maximizes a cell proliferation effect.

BACKGROUND ART

Ultra-microlight is light or energy that has a polychromatic wavelength in a visible light spectrum band and of which intensity is so weak to have brightness corresponding to 1/500,000 of brightness of a general fluorescent lamp. This ultra-microlight is at least 1,000 times weaker than bioluminescence and thus has excellent efficiency and safety. The possibility that the ultra-microlight could affect living creatures was first raised in academia in the 1930s, and thereafter, Popp, a German photobiologist, published experimental results showing that information exchange between cells occurred through the ultra-microlight. Based on this background, as a result of many years of research performed by radiating ultra-microlight onto living creatures through an ultra-microlight generator, the safety and usefulness of the ultra-microlight was confirmed.

Ultra-microlight emitted from living creatures has very weak intensity and thus is referred to as ultra weak photon emission or biophoton emission. The phenomenon of biophoton emission is related to reactive oxygen species (ROS) generated during a normal metabolic process of living creatures. These ROS are formed as natural byproducts of oxygen from normal metabolism and play important roles in cell signaling and homeostasis.

For example, ultra-microlight can activate the biometabolism of living creatures and strengthen immunity. For a more specific example, ultra-microlight generated through an ultra-microlight generator may be radiated onto livestock, and the ultra-microlight may be absorbed into the body of the livestock to activate metabolism to increase cell proliferation and protein synthesis, which may improve immunity. That is, the ultra-microlight can improving the immunity and anti-aging and antioxidant abilities of living creatures to provide various effects of increasing body weight and shortening a market age. Korean Patent Publication No. 10-2019-0127223 discloses a method of strengthening immunity of shrimp through light radiation.

Meanwhile, in order for ultra-microlight to be radiated onto various living creatures and provided to maximize various effects, it is important that an ultra-microlight generator generates light or energy in a more appropriate and efficient manner. For example, when photoelectron energization efficiency is increased, or thermionic (or photoelectric) emission is maximized, the efficiency of generating ultra-microlight can be further improved. That is, through the efficient structural features of a light generating device, ultra-microlight may be generated through improved energy efficiency or the fewer number of processing processes.

Therefore, in the art, there may be a demand for a light radiation device that generates ultra-microlight that is more excellent for providing bioenergy through optimal efficiency.

DETAILED DESCRIPTION

Technical Problem

The present invention is directed to provide an ultra-microlight transmission device which generates and provides ultra-microlight with improved cell proliferation efficiency.

The technical problems to be solved by the present invention are not limited to the above-described problems, and any other technical problems that are not described herein will be clearly understood from the following description by those skilled in the art to which the present invention pertains.

Technical Solution

According to an aspect of the present invention, there is provided an ultra-microlight transmission device using secondary electrons, including a light source module configured to generate light, a housing which includes an interior space and performs spectroscopy and diffuse reflection on light introduced into the interior space, a first filter unit configured to convert the spectroscopic and diffusely reflected light into monochromatic light, and a second filter unit configured to cause diffraction and interference for the converted light.

The light source module may include a photoelectric surface configured to emit primary electrons based on light or voltage application, an electron amplification unit configured to amplify the primary electrons to emit secondary electrons, and a light source housing including the photoelectric surface and the electron amplification unit.

The light source module may include a light inlet configured to allow light to be introduced into the photoelectric surface, a light outlet configured to emit the secondary electrons to the outside, a first voltage generator configured to apply a voltage to the photoelectric surface, and a second voltage generator configured to generate a potential difference for causing movement of the emitted primary electrons.

The electron amplification unit may be constituted by arranging a plurality of prisms, and each of the plurality of prisms may include a plurality of protrusions protruding in a direction perpendicular to an arrangement direction.

The plurality of prisms may be disposed such that the protrusions formed on each of the plurality of prisms are misaligned with each other.

The ultra-microlight transmission device may further include a heat radiation member configured to absorb heat generated by the light source module and transfer the absorbed heat to the housing.

The housing may include a wall prism provided inside the interior space and configured to perform spectroscopy and diffuse reflection on the introduced light in multiple directions, and the spectroscopic and diffusely reflected light may be radiated to the housing to emit photoelectrons to the interior space.

An inner wall of the housing may be made of a stainless steel material, and the wall prism may be made of an acrylic material and supported on the inner wall.

The second filter unit may adjust the converted light by causing continuous diffraction and interference through a plurality of prism discs.

The ultra-microlight transmission device may further include a third filter unit configured to perform filtering on light transmitted from the second filter unit, and the third filter unit may be made of a black body acrylic plate material and may filter light with predetermined energy intensity among the light transmitted from the second filter unit to emit the filtered light to the outside.

The ultra-microlight transmission device may further include an electromagnetic wave generator provided to surround an outer surface of the housing and configured to generate electromagnetic waves, and a blocking film provided to surround an outer surface of the electromagnetic wave generator and configured to block one-directional movement of the electromagnetic waves.

The ultra-microlight transmission device may further include a metal plate provided in one area of the interior space of the housing.

According to another aspect of the present invention, there is provided a method of generating light energy, the method including radiating light, which is related to secondary electrons and generated by a light source module, to an interior space of a housing, performing spectroscopy and diffuse reflection on the light introduced into the interior space of the housing, performing conversion on the spectroscopic and diffusely reflected light through a first filter unit, and causing diffraction and interference for the converted light through a second filter unit.

Other specific details of the invention are included in the detailed description and drawings.

Effect of the Invention

According to various embodiments of the present invention, it is possible to provide an ultra-microlight transmission device that generates and supplies ultra-microlight with enhanced cell proliferation efficiency.

The effects of the present invention are not limited to the effects mentioned above; additional effects, which are not explicitly mentioned, may be readily understood by those skilled in the art from the description below.

BRIEF DESCRIPTION OF THE DRAWINGS

Various aspects are now described with reference to the drawings, wherein like reference numerals are used to generally refer to similar components. In the following embodiments, for purposes of description, numerous specific detailed items are presented to provide a thorough understanding of one or more aspects. However, it may be apparent that such aspect(s) may be performed without these detailed items.

DETAILED DESCRIPTION OF EXEMPLARY EMBODIMENTS

Figure 1:
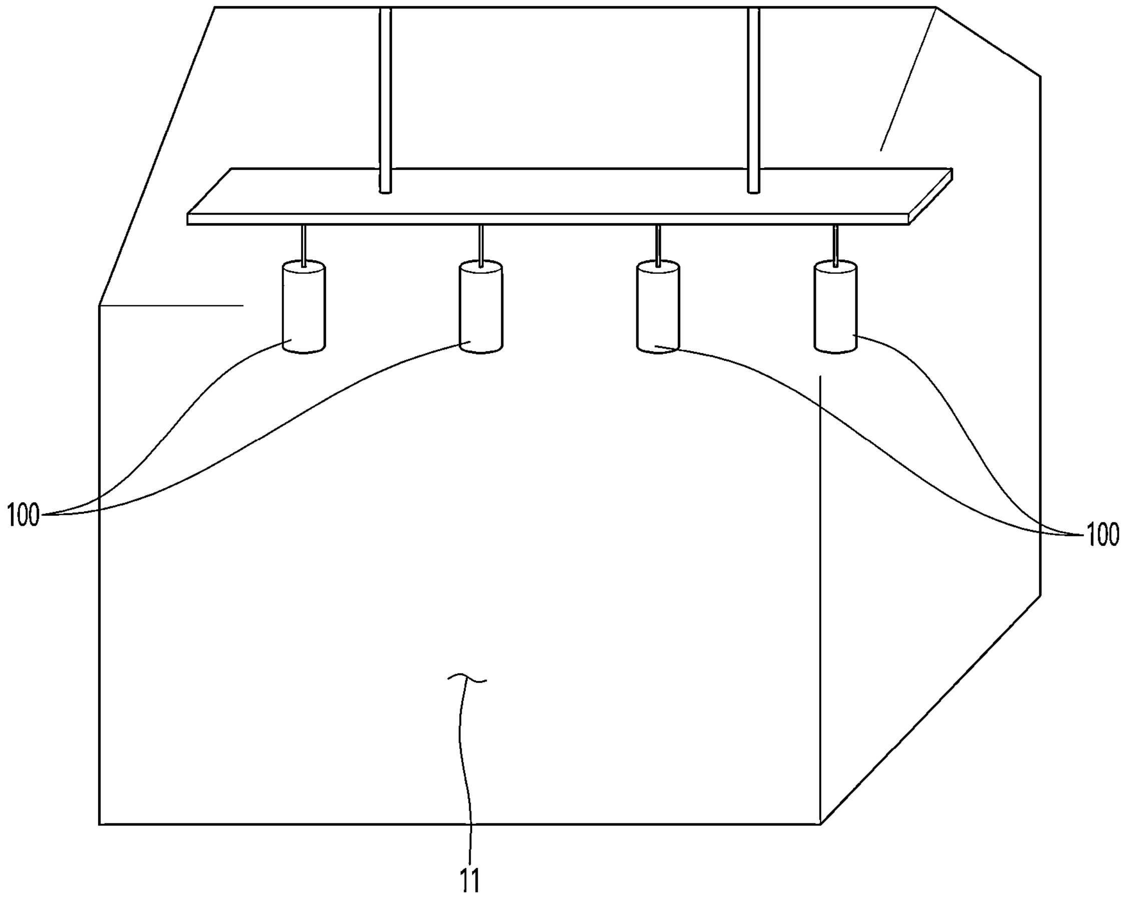
FIG. 1 is schematic view of a system for improving cell proliferation efficiency using an ultra-microlight transmission device according to one embodiment of the present invention.

Various embodiments and/or aspects will be described with reference to the accompanying drawings below. In the following description, for purposes of the description, numerous specific detailed items are presented to help overall understanding of one or more aspects. However, it will also be appreciated by those skilled in the art that the aspect(s) may be carried out without these detailed items. The following disclosure and the accompanying drawings disclose specific exemplary aspects of one or more aspects in detail. However, these aspects are exemplary, some of the various methods in the principles of the various aspects may be used, and the disclosed descriptions are intended to include all these aspects and their equivalents. Specifically, as used herein, “embodiment,” “example,” “aspect,” “exemplary,” and the like are not to be understood as any described aspect or design being better or more advantageous than other aspects or designs.

Hereinafter, the same reference numerals denote the same or similar components regardless of the reference numerals, and overlapping descriptions thereof will be omitted. Further, in the description of the embodiments disclosed in the specification, when it is determined that detailed descriptions of related known technologies may obscure the principle of the embodiments disclosed in the specification, the detailed description thereof will be omitted. In addition, the accompanying drawings are only for easy understanding of the embodiments disclosed in the specification, and the technical spirit disclosed in the specification is not limited by the accompanying drawings.

Although first, second, and the like are used to describe various elements or components, these elements or components are not limited by these terms. These terms are only used to distinguish one element or component from another. Accordingly, a first element or component to be mentioned below may be a second element or component within the spirit of the present invention.

Unless otherwise defined, all terms (including technical and scientific terms) used herein have the same meaning as commonly understood by one having ordinary knowledge in the art to which the present invention belongs. Further, terms defined in a commonly used dictionary are not to be interpreted ideally or excessively unless otherwise defined.

In addition, the term "or" is intended to mean an inclusive "or" rather than an exclusive "or." That is, unless otherwise specified or clear from context, "X uses A or B" is intended to mean one of the natural implicit substitutions. That is, when X uses A, X uses B, or X uses both A and B, "X uses A or B" may be applied to either of these cases. It should also be understood that the term "and/or" as used herein refers to and includes all possible combinations of one or more of the listed related items.

Further, it should be understood that the terms "comprises" and/or "comprising" mean that the feature and/or component is present, but does not exclude the presence or addition of one or more other features, components, and/or groups thereof. In addition, unless otherwise specified or when it is not clear from the context as referring to a singular form, the singular form in the specification and claims should generally be construed to mean "one or more."

When a certain component is mentioned as being "connected" or "linked" to another component, it should be understood that the certain component may be directly connected or linked to another component, but still another component may be present therebetween. On the other hand, when it is mentioned that a certain component is "directly connected" or "directly linked" to another element, it should be understood that there is no other certain component therebetween.

The suffixes "module" and "part" for the components used in the following description are given or mixed in consideration of only the ease of writing the specification, and do not have a distinct meaning or role by themselves.

Reference to an element or layer "above" or "on" another element or layer includes all cases in which the element or layer directly on another element or another layer as well as the element or layer on another element or layer with still another element or layer therebetween. On the other hand, a case in which an element is referred to as "directly on" or "immediately on" refers to a case in which another element or layer is not interposed therebetween.

Spatially relative terms "below," "beneath," "lower," "above," "upper," and the like may be used to easily describe a component or a correlation with other components as shown in the drawings. Spatially relative terms should be understood as terms including different directions of an element during use or operation in addition to a direction shown in the drawings.

For example, when components shown in the drawing are reversed, a component described as "below" or "beneath" another component may be placed "above" the other component. Thus, the example term "below" may include both orientations of below and above. Components may also be oriented in other directions, and accordingly, spatially relative terms may be interpreted according to orientation.

Objects and effects of the present invention, and technical configurations for achieving them will be apparent with reference to the embodiments to be described below in detail with the accompanying drawings. In the description of the present invention, when it is determined that detailed descriptions of a well-known function or configuration may unnecessarily obscure the gist of the present invention, the detailed descriptions thereof will be omitted. Further, the terms to be described below are terms defined in consideration of functions in the present invention and thus may vary according to intentions or customs of users and operators.

However, the present invention is not limited to the embodiments to be disclosed below and may be implemented in various different forms. Only the present embodiments are provided so that the present invention is complete, and to completely convey the scope of the disclosure to those skilled in the art, and the present invention is only defined by the scope of the claims. Accordingly, the definition should be made based on the content throughout the specification.

FIG. 1 is schematic view of a system for improving cell proliferation efficiency using an ultra-microlight transmission device according to one embodiment of the present invention.

As shown in FIG. 1, a plurality of ultra-microlight transmission devices 100 may be provided in one area of an indoor space 11. Here, the indoor space 11 may be a space in which living creatures are active. For example, the indoor space 11 may be a space in which living creatures related to livestock, such as cows, pigs, ducks, and chickens, are raised, but is not limited thereto.

The ultra-microlight transmission device 100 may be provided in one area of an upper side of the indoor space 11 and may radiate light for increasing the cell promotion efficiency of living creatures toward a lower portion at which the living creatures are active. The ultra-microlight transmission device 100 may be provided to have a certain separation distance from the living creatures. For example, the ultra-microlight transmission device 100 may be provided to have a separation distance of 1 m to 5 m from the living creatures in the indoor space. For a more specific example, the ultra-microlight transmission device 100 may be provided at a circle having a radius of 2 m from the living creatures to radiate light onto the living creatures. The description of specific numerical values of the position of the above-described transmission device is merely an example, and the present invention is not limited thereto.

The ultra-microlight transmission device 100 may generate ultra-microlight that contributes to an improvement in cell proliferation efficiency and may radiate the generated ultra-microlight onto living creatures. The ultra-microlight generated and radiated by the ultra-microlight transmission device 100 may be related to light that has a polychromatic wavelength in a visible light spectrum band and of which intensity is so weak to have brightness corresponding to 1/500,000 of brightness of a general fluorescent lamp.

The ultra-microlight with such a weak intensity can contribute to an improvement in cell proliferation efficiency of living creatures. For example, the ultra-microlight with such a weak intensity can activate the biometabolism of living creatures and strengthen immunity. For a more specific example, bioenergy light generated and emitted through the ultra-microlight transmission device may be radiated onto living creatures, and the bioenergy light may be absorbed into the body of the living creatures to activate metabolism to increase cell proliferation and protein synthesis, which may improve immunity. That is, bioenergy light can improve the immunity and anti-aging and antioxidant abilities of living creatures to provide various effects of increasing body weight and shortening a market age.

The ultra-microlight transmission device 100 of the present invention may generate ultra-microlight that is radiated onto living creatures to maximize various provided effects. To this end, the ultra-microlight transmission device 100 may be provided to have structural features for generating ultra-microlight through optimal efficiency. Optimal ultra-microlight may be ultra-microlight that maximizes the cell proliferation efficiency of living creatures or ultra-microlight generated with optimal efficiency.

For example, in order to generate or emit optimal ultra-microlight, it may be important to maximize a photoelectric effect or thermionic emission. For a more specific example, when a photoelectric effect is maximized by increasing the photoelectric emission efficiency in which photons are converted into photoelectrons, or the thermionic emission efficiency is improved, ultra-microlight may be generated with less energy consumption. In other words, as photoelectric or thermionic emission efficiency is increased, the efficiency of generating ultra-microlight can be maximized. That is, the ultra-microlight transmission device 100 of the present invention may be implemented through a structure that maximizes a photoelectric effect and heat emission efficiency and thus may generate ultra-microlight through optimal efficiency such as minimizing energy consumption, thereby radiating the ultra-microlight onto living creatures. The structural features, configuration, action, and effects generated therethrough of an ultra-microlight transmission device that generates optimal ultra-microlight will be described in more detail below with reference to FIGS. 2 to 11.

Figure 2:
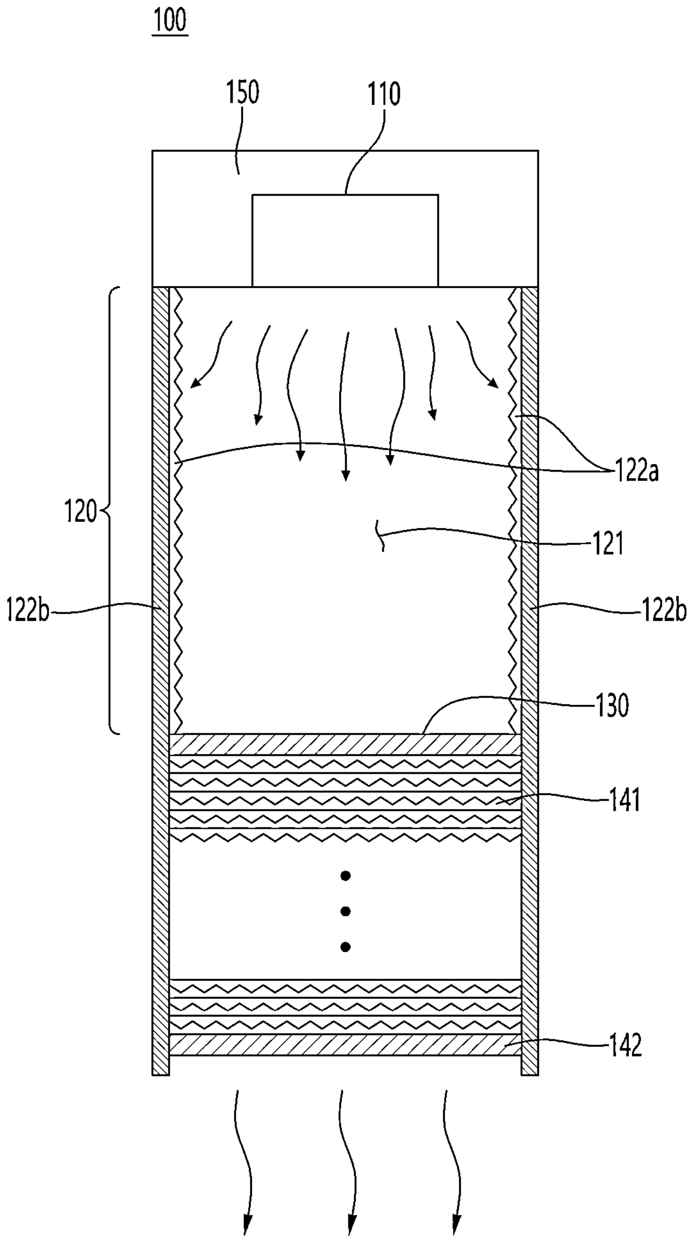
FIG. 2 is an exemplary cross-sectional view of an ultra-microlight transmission device that provides a cell proliferation effect according to one embodiment of the present invention.

FIG. 2 is an exemplary cross-sectional view of an ultra-microlight transmission device that provides a cell proliferation effect according to one embodiment of the present invention. As shown in FIG. 2, an ultra-microlight transmission device 100 may include a light source module 110, a housing 120, a first filter unit 130, a second filter unit 141, a third filter unit 142, and a heat radiation member 150. The above-described components are exemplary, and the scope of the present invention is not limited to the above-described components. That is, according to the implementation aspect of the embodiments of the present invention, additional components may be included, or some of the above-described components may be omitted.

According to one embodiment of the present invention, the ultra-microlight transmission device 100 may include the light source module 110. The light source module 110 may generate light related to infrared light, visible light, ultraviolet light, or the like. The light source module 110 may generate amplified light through secondary electron emission. This light source module 110 may be disposed in one direction of the housing 120 and may transmit amplified light to the housing 120.

According to one embodiment, the light source module 110 may include a photoelectric surface 112 that emits primary electrons based on light or voltage application, an electron amplification unit 114 that amplifies the primary electrons to emit secondary electrons, and a light source housing 110*a* which forms a light source interior space 110*a*-1 in which the photoelectric surface 112 and the electron amplification unit 114 are provided. The light source module 110 according to one embodiment of the present invention will be described in more detail below with reference to FIGS. 3 to 7.

Figure 3:
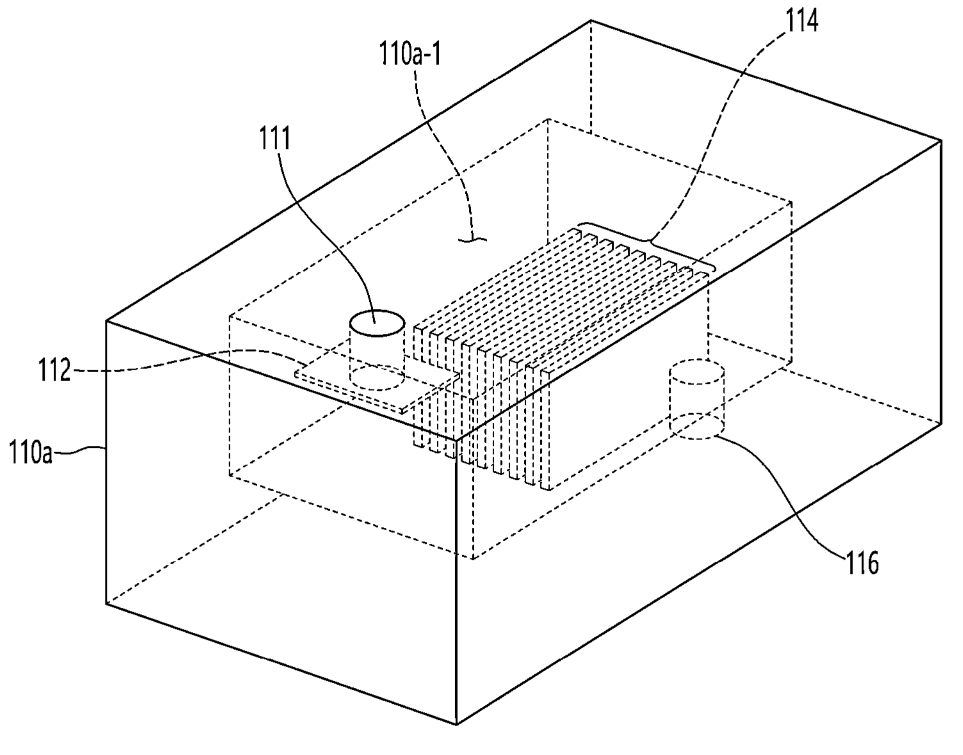
FIG. 3 is an exemplary perspective view of a light source module according to one embodiment of the present invention.
Figure 4:
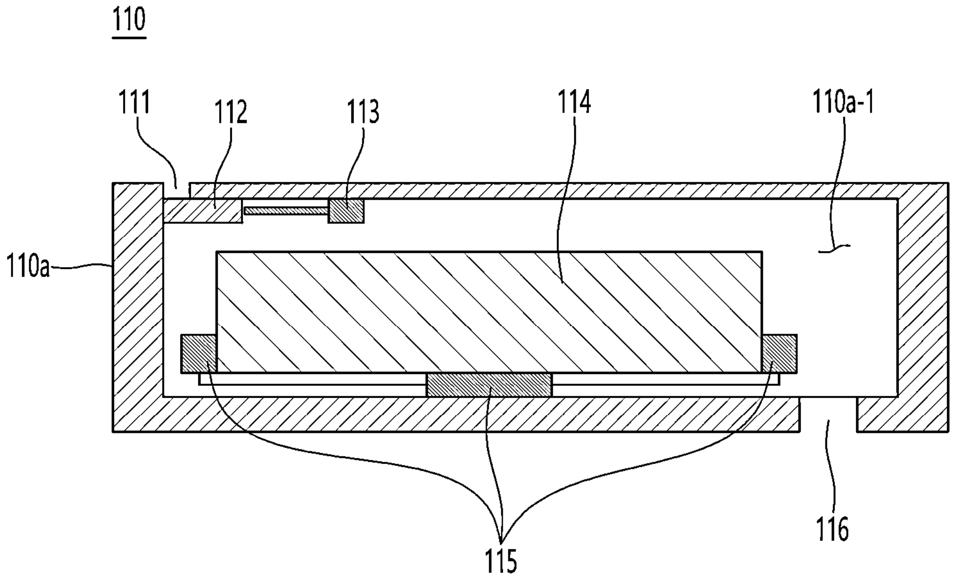
FIG. 4 is an exemplary cross-sectional view of the light source module according to one embodiment of the present invention.
Figure 5:
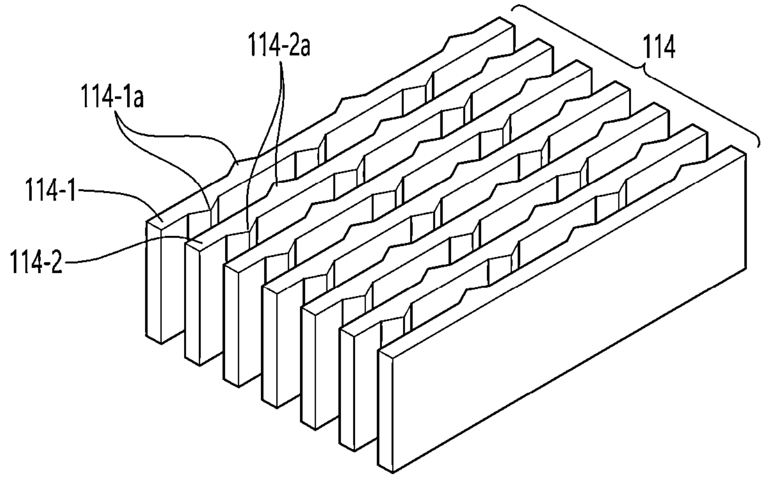
FIG. 5 is an exemplary view illustrating an electron amplification unit according to one embodiment of the present invention.
Figure 6:
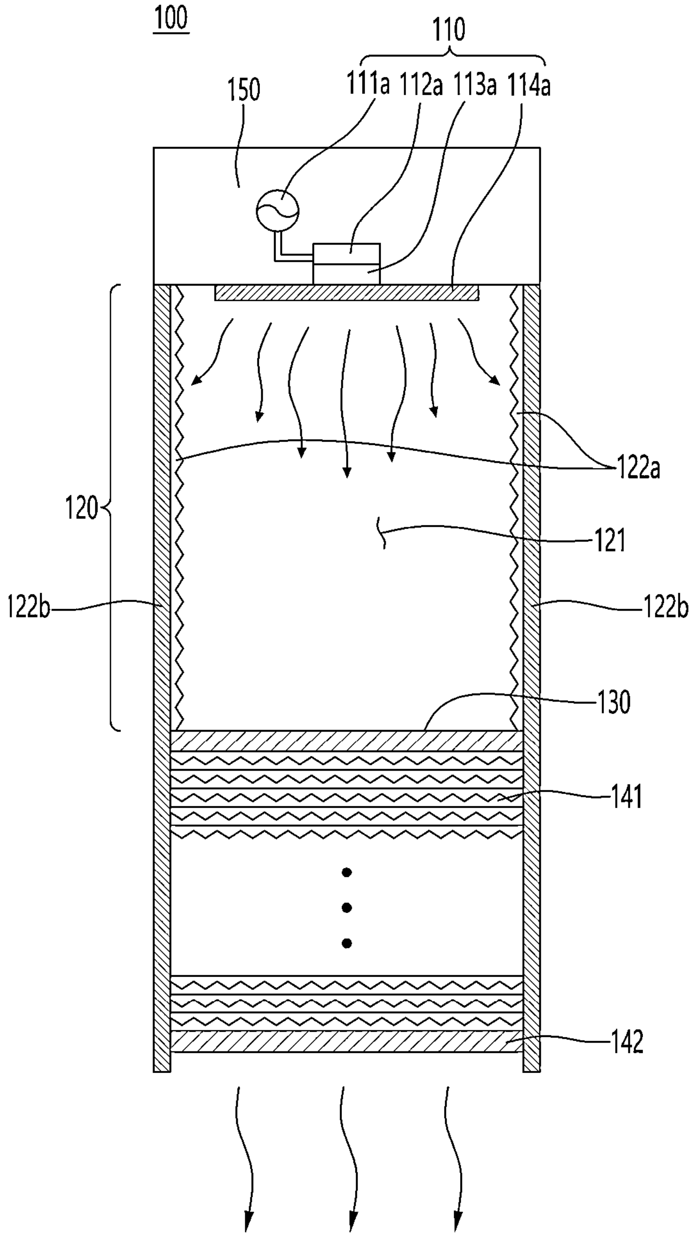
FIG. 6 is an exemplary cross-sectional view of an ultra-microlight transmission device that provides a cell proliferation effect according to another embodiment of the present invention.
Figure 7:
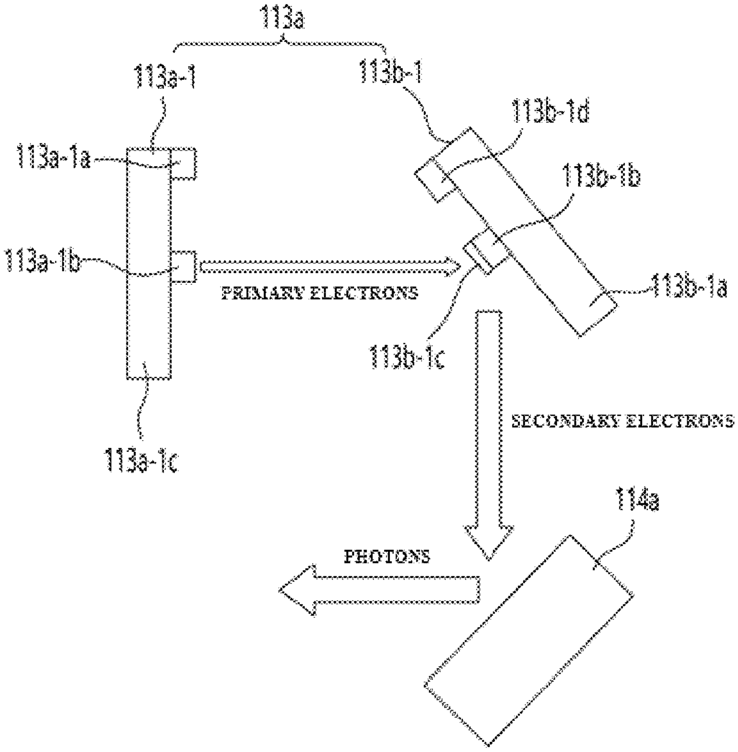
FIG. 7 is an exemplary diagram illustrating a process in which amplified light is generated through a light source module according to another embodiment of the present invention.

FIG. 3 is an exemplary perspective view of the light source module according to one embodiment of the present invention. FIG. 4 is an exemplary cross-sectional view of the light source module according to one embodiment of the present invention. FIG. 5 is an exemplary view illustrating the electron amplification unit according to one embodiment of the present invention. FIG. 6 is an exemplary cross-sectional view of an ultra-microlight transmission device that provides a cell proliferation effect according to another embodiment of the present invention. FIG. 7 is an exemplary view illustrating a process in which amplified light is generated through a light source module according to another embodiment of the present invention.

Referring to FIG. 3, the light source module 110 may include a light inlet 111 that allows light to be introduced into the photoelectric surface 112. According to one embodiment, the light source module 110 may include a light source housing 110*a*, and the light inlet 111 may be formed in a portion of the light source housing 110*a*. The light inlet 111 may be formed in a shape of a hole with a predetermined diameter in one upper surface of the light source housing 110*a*. In an embodiment, light may be input through the light inlet 111, and the light input through the light inlet 111 may be transmitted to the photoelectric surface 112. According to one embodiment, the light source interior space 110*a*-1 of the light source housing 110*a* may be in a vacuum state. In this case, the light source interior space 110*a*-1 may be a space in which the electron amplification unit 114 is provided, and the electron amplification unit 114 may serve to amplify electrons. According to an embodiment, when the light source interior space 110*a*-1 is in a vacuum state, electron amplification efficiency can be improved.

According to one embodiment, the light source module 110 may include a first voltage generator 113 and the photoelectric surface 112. The first voltage generator 113 and the photoelectric surface 112 may be provided inside the light source housing 110*a*. The first voltage generator 113 may apply a voltage to the photoelectric surface 112. The photoelectric surface 112 may emit electrons or photons based on the voltage applied from the first voltage generator 113. In an embodiment, the photoelectric surface 112 may be positioned at a lower end of the light inlet 111, may receive light input through the light inlet 111, and may emit electrons or photons (for example, primary electrons) based on the voltage applied through the first voltage generator 113 and the input light. According to one embodiment, the photoelectric surface 112 may emit electrons based on the applied voltage. Here, the applied voltage may be the voltage applied from the first voltage generator 113. In one embodiment, the photoelectric surface 112 may determine an amount of emission of electrons based on a magnitude of the voltage applied from the first voltage generator 113. For example, as a higher voltage is applied from the first voltage generator 113, an amount of electrons generated by the photoelectric surface 112 may increase. In other words, an amount of electrons generated through the light source module 110 or an amount of light generated based on the electrons may be based on the voltage applied through the first voltage generator 113.

More specifically, the photoelectric surface 112 may receive light through the light inlet 111 positioned thereon and may generate electrons and photons based on the received light and the voltage applied from the first voltage generator 113. In an embodiment, the photoelectric surface 112 may include a fluorescent layer, and electrons emitted through voltage application may collide with the fluorescent layer to generate photons. In other words, the photoelectric surface 112 may emit primary electrons based on the light introduced through the light inlet 111 and the voltage applied from the first voltage generator 113.

According to one embodiment of the present invention, the light source module 110 may include the electron amplification unit 114 that amplifies electrons, and a second voltage generator 115 that applies a voltage to the electron amplification unit 114. Referring to FIG. 4, the electron amplification unit 114 may be positioned below the photoelectric surface 112 and may amplify primary electrons emitted through the photoelectric surface 112 to emit secondary electrons. Specifically, the second voltage generator 115 may supply a voltage in contact with each of one end of the photoelectric surface 112 and the other end corresponding to the one end. A potential difference may be generated between both ends of the electron amplification unit 114 by the voltage of the second voltage generator 115, and thus electrons or photons (that is, primary electrons) move in one direction. More specifically, referring to FIG. 4, the primary electrons emitted through the photoelectric surface 112 move from one direction (for example, a left direction in the drawing) to another direction (for example, a right direction in the drawing) by a potential difference caused through the second voltage generator 115. That is, the second voltage generator 115 may generate a potential difference to cause movement of primary electrons. While moving in one direction, the primary electrons may be amplified by the electron amplification unit 114, and thus, secondary electrons may be generated.

In an embodiment, the electron amplification unit 114 may be constituted through an arrangement between a plurality of prisms. Specifically, as shown in FIGS. 3 and 5, the electron amplification unit 114 may be formed by regularly arranging the plurality of prisms. Accordingly, when primary electrons move in one direction between the plurality of prisms, the primary electrons may continuously collide with each of the prisms to be amplified, thereby generating secondary electrons. That is, the secondary electrons may mean that an amount of electrons is considerably increased as compared to the primary electrons.

According to one embodiment, each of the plurality of prisms included in the electron amplification unit 114 may include a plurality of protrusions that protrude in a direction that is not parallel to an arrangement direction. For example, each of the plurality of prisms constituting the electron amplification unit 114 may include the plurality of protrusions that protrude in a direction perpendicular to the arrangement direction of each prism. For a more specific example, as shown in FIG. 5, the plurality of prisms may include a first prism 114-1 and a second prism 114-2, and the first prism 114-1 and the second prism 114-2 may include a plurality of first protrusions 114-1*a* and a plurality of second protrusions 114-2*a*, respectively.

In an embodiment, the plurality of prisms may be arranged such that the protrusions formed on each of the plurality of prisms are disposed to be misaligned with each other. For example, the plurality of first protrusions 114-1*a* formed on the first prism 114-1 may be disposed to be misaligned with each other, and the plurality of second protrusions 114-2*a* formed on the second prism 114-2 may be disposed to be misaligned with each other. When the protrusions formed on each prism are arranged to be misaligned with each other, the number of collisions between each of the prisms and primary electrons may be considerably increased while the primary electrons move in one direction between the plurality of prisms. In addition, the protrusions formed on each prism may prevent electrons from returning in a reverse direction. In other words, through the protrusions, it is possible to prevent the primary electrons from being transmitted in a direction different from an intended direction and simultaneously increase the number of collisions, thereby maximizing an amount of amplification of the primary electrons, that is, an amount of generation (or emission) of secondary electrons.

In an embodiment, the light source module 110 may include a light outlet 116 for emitting secondary electrons to the outside. As shown in FIGS. 3 and 4, the light outlet 116 may be provided in a shape of a hole with a predetermined diameter in a lower surface of the light source housing 110*a*. The light outlet 116 may emit secondary electrons, which are generated by primary electrons being amplified while moving between the plurality of prisms by a potential difference, to the outside. Here, the outside may mean the housing 120 positioned below the light source module 110.

That is, the light source module 110 may generate photons related to light amplified through secondary electron emission to transmit the generated photons to the interior space 121 of the housing. In this case, through light (or photons) generated and transmitted by the light source module 110, a small amount of electrons (that is, primary electrons) emitted by the photoelectric surface 112 may be amplified in the electron amplification unit 114 to emit a large amount of electrons (for example, secondary electrons), thereby further maximizing light use efficiency. Accordingly, photoelectric emission efficiency can be maximized in a process of generating ultra-microlight using light, which will be described below, and as a result, the efficiency of generating ultra-microlight can be improved.

FIG. 6 is an exemplary cross-sectional view of the ultra-microlight transmission device that provides a cell proliferation effect according to another embodiment of the present invention. As shown in FIG. 6, a light source module 110 may include a power source 111*a*, a voltage generation element 112*a*, an electron emission element 113*a*, and a first photoelectric surface 114*a*. The power source 111*a* may supply power to the voltage generation element. The voltage generation element 112*a* may apply a voltage to at least one of the electron emission element 113*a* and the first photoelectric surface 114*a* through the power applied from the power source 111*a*. The electron emission element 113*a* and the first photoelectric surface 114*a* may emit electrons or photons based on the voltage applied from the voltage generation element 112*a*.

According to one embodiment, the electron emission element 113*a* may emit electrons based on the applied voltage. Here, the applied voltage may be the voltage applied from the voltage generation element 112*a*. In one embodiment, the electron emission element 113*a* may determine an amount of emission of electrons based on a magnitude of the voltage applied from the voltage generation element 112*a*. For example, as a higher voltage is applied from the voltage generation element 112*a*, an amount of electrons generated by the electron emission element 113*a* may increase. In other words, an amount of electrons generated through the light source module 110 or an amount of light generated based on the electrons may be based on the voltage applied through the voltage generation element 112*a*.

According to one embodiment, electrons emitted from the electron emission element 113*a* may collide with a fluorescent layer formed on the first photoelectric surface 114*a* to generate photons. That is, the electron emission element 113*a* may emit electrons toward the first photoelectric surface 114*a*, and as the emitted electrons collide with the fluorescent layer formed on the first photoelectric surface 114*a*, light (or photons) may be generated. The first photoelectric surface 114*a* may generate light (or photons) based on the electrons emitted from the electron emission element 113*a*.

Specifically, the first photoelectric surface 114*a* may include the fluorescent layer and an anode. The anode may be formed on the first photoelectric surface 114*a*, and the fluorescent layer may be applied on the anode.

For example, the anode may be provided as a transparent conductive layer including indium tin oxide (ITO) and metal such as tungsten. A voltage may be supplied to the anode of the first photoelectric surface 114*a* from the voltage generation element 112*a*. As a voltage is supplied to the anode of the first photoelectric surface 114*a*, when electrons (that is, electrons transmitted from the electron emission element) collide with the fluorescent layer, the electrons may be accelerated by the voltage to excite a fluorescent material and metal to emit light.

In one embodiment, the electron emission element 113*a* may include a first electron emission element 113*a*-1 and a second electron emission element 113*b*-1. The first electron emission element 113*a*-1 may emit electrons. The second electron emission element 113*b*-1 may amplify the electrons emitted from the first electron emission element 113*a*-1.

Specifically, referring to FIG. 7, electrons emitted from the first electron emission element 113*a*-1 may be transmitted to the second electron emission element 113*b*-1. In this case, the first electron emission element 113*a*-1 may include a first substrate 113*a*-1*a*, a cathode formed on an inner surface of the first substrate 113*a*-1*a*, a first emitter 113*a*-1*b* bonded to an upper portion of the cathode, and a first gate electrode 113*a*-1*c* formed on one surface of the first substrate 113*a*-1*a*. Here, the first emitter 113*a*-1*b* may be an electrode that emits carriers and may adjust electrons emitted from the cathode to be transmitted toward the second electron emission element 113*b*-1. For example, the first emitter 113*a*-1*b* may be made of diamond, diamond-like carbon, or carbon nanotubes. A voltage may be applied to the first gate electrode 113*a*-1*c*, electrons are generated at the cathode based on the voltage applied to the first gate electrodes 113*a*-1*c*, and the generated electrons (for example, primary electrons) may be transmitted toward the second electron emission element 113*b*-1 through the first emitter 113*a*-1*b*.

The second electron emission element 113*b*-1 may include a second substrate 113*b*-1*a*, a second emitter 113*b*-1*b* bonded to an upper portion of the second substrate 113*b*-1*a*, an electron amplification layer 113*b*-1*c* bonded to one surface of the second emitter 113*b*-1*b*, and a second gate electrode 113*b*-1*d* formed on one surface of the second substrate 113*b*-1*a*. The second emitter 113*ab*-2 may be used to transmit electrons amplified through the electron amplification layer 113*b*-1*c* to the first photoelectric surface 114*a*. A voltage may be applied to the second gate electrodes 113*b*-1*d*, and electrons may be amplified based on the voltage applied to the second gate electrodes 113*b*-1*d*.

According to one embodiment, the electron amplification layer 113*b*-1*c* may be made of a plurality of carbon nanotubes. Since the plurality of carbon nanotubes have physically sharp ends, electric field emission may be possible in a certain range. That is, the electron amplification layer 113*b*-1*c* made of the plurality of carbon nanotubes may efficiently emit electrons. For example, the electron amplification layer 113*b*-1*c* may be provided to include at least one of conductive single wall carbon nanotubes and multi-wall carbon nanotubes. The carbon nanotubes included in the electron amplification layer 113*b*-1*c* may have a diameter of 1 nm to 20 nm and a length of 1 μm to 10 μm. In this case, electron emission efficiency can be improved due to a high aspect ratio. In addition, according to the embodiment, the electron amplification layer 113*ab*-3 is made of at least one material selected from the group consisting of SiO2, MGF2, CaF2, LiF, MgO, Al2O3, ZnO, CaO, SrO, and La2O3 which have a high electron amplification coefficient. Accordingly, the electron amplification layer 113*b*-1*c* may emit secondary electrons. In this case, the electron amplification layer 113*b*-1*c* is made of a material that has excellent electron emission and is capable of emitting secondary electrons, thereby obtaining a large amount of electrons. That is, electrons transmitted from the first electron emission element 113*a*-1 allow secondary electrons to be emitted through the electron amplification layer 113*b*-1*c* of the second electron emission element 113*b*-1, thereby enabling electron amplification through which a large amount of electrons are generated.

In this case, the first photoelectric surface 114*a* may generate light (or photons) based on electrons (that is, secondary electrons) emitted from the second electron emission element 113*b*-1. Specifically, a voltage applied from the voltage generation element 112*a* may be applied to the anode of the first photoelectric surface 114*a*, and electrons (for example, secondary electrons) may collide with the fluorescent layer applied on one surface of the anode. That is, light (that is, photons) may be generated as electrons collide with the fluorescent layer of the first photoelectric surface 114*a* to which a voltage is applied.

That is, the light source module 110 may generate photons related to light amplified through secondary electron emission to transmit the generated photons to the interior space 121 of the housing. In this case, through light (or photons) generated and transmitted by the light source module 110, a small amount of electrons (that is, primary electrons) emitted by the first electron emission element 113*a*-1 may be amplified in the second electron emission element 113*b*-1 to emit a large amount of electrons (for example, secondary electrons), thereby further maximizing light use efficiency. Accordingly, photoelectric emission efficiency can be maximized in a process of generating ultra-microlight using light, which will be described below, and as a result, the efficiency of generating ultra-microlight can be improved.

According to one embodiment of the present invention, the ultra-microlight transmission device 100 may include the heat radiation member 150. A power source that applies power to the light source module 110 may be provided in one area inside the heat radiation member 150. The heat radiation member 150 may diffuse heat generated by the power source. That is, the heat radiation member 150 may effectively control an increase in amount of heat generated inside electronic devices during continuous use, that is, a heat generation phenomenon.

The heat radiation member 150 may be made of a material with excellent thermal conductivity. As thermal conductivity becomes higher, heat energy may be well transmitted (that is, diffused) to other places, thereby effectively controlling generated heat. For example, the heat radiation member 150 may be made of a metal or ceramic material with high thermal conductivity. In addition, for example, the heat radiation member 150 may be made of a polymer composite material formed in such a manner that one of a carbon-based filler and a ceramic-based filler, which have excellent thermal conductivity, is used or a mixture thereof is uniformly spectroscopic in a polymer matrix and highly fill the polymer matrix, wherein the carbon-based filler includes graphite, carbon fiber, carbon nanotubes, or graphene, and the ceramic-based filler includes boron nitride, aluminum nitride, or alumina. The specific description of the materials constituting the above-described heat radiation member is merely an example, and the present invention is not limited thereto. According to an additional embodiment, the heat radiation member 150 is made of a material of which a thermal expansion coefficient is a predetermined level or less, thereby reducing the possibility of failure due to component defects due to heat generation.

The heat radiation member 150 may be positioned in one direction (for example, an upward direction) of the light source module 110 and provided adjacent to the housing 120. As shown in FIG. 2, the heat radiation member 150 may be provided in contact with one surface of the housing 120, and thus heat generated in a process in which the light source module 110 generates light may be transferred to the housing 120. That is, the heat radiation member 150 may diffuse generated heat into the housing 120. In this case, the housing 120 may form an interior space 121 in which a photoelectric effect or heat radiation operation occurs. As the heat radiation member 150 diffuses heat into the housing 120, thermionic emission efficiency can be improved in the interior space 121 of the housing 120, which may ultimately maximizes thermionic emission to maximize the efficiency of generating ultra-microlight.

According to one embodiment of the present invention, the ultra-microlight transmission device 100 may include the housing 120. In the interior space 121 of the housing 120, introduced light may be spectroscopic and diffusely reflected in multiple directions. As shown in FIG. 2, a wall prism 122*a* may be formed in the interior space 121 of the housing 120 in an inward direction of the housing 120, and light may be spectroscopic and diffusely reflected through the wall prism 122*a* to emit photoelectrons to the interior space 121.

Specifically, light generated by the light source module 110 may be radiated to the interior space 121 of the housing 120, and as the light strikes a wall in the interior space 121, photoelectrons may be generated. In this case, since the light itself emitted from the light source module 110 is composed of photons with a variety of energy, an energy level of photoelectrons generated in the interior space 121 may also vary.

Specifically, light introduced from the light source module 110 may be spectroscopic and diffusely reflected through the wall prism 122*a* of the housing 120 to emit photoelectrons. Specifically, the wall prism 122*a* may be made of an acrylic material and formed in a shape of a figure on a plane that is not parallel to a side surface of the housing 120. That is, the wall prism 122*a* may include a plurality of polygonal prisms protruding inward from a side wall of the housing 120 in a shape in which at least one pair of faces are not parallel. For example, the plurality of polygonal prisms may be provided in a triangular prism shape. However, the shape of the plurality of polygonal prisms constituting the wall prism is not limited thereto and may be implemented through various shapes such as a polygonal prism shape, a polygonal pyramid shape, a cone shape, and a spherical shape.

The plurality of polygonal prisms constituting the wall prism 122*a* may have various sizes ranging from several nanometers to several millimeters. When light radiated from the light source module 110 is incident on the wall prism 122*a* (that is, each of the plurality of polygonal prisms), a degree of refraction varies according to a wavelength or frequency, which may cause dispersion. In other words, light is dispersed for each wavelength (for example, each energy level) through the wall prism 122*a*.

In addition, the housing 120 may include an inner wall 122*b* that supports the wall prism 122*a* and is made of a metal material. According to one embodiment, the inner wall 122*b* may be made of a stainless steel material. As shown in FIG. 2, the inner wall 122*b* may be formed along an inner surface of the housing 120 having a cylindrical shape, and the wall prism 122*a* constituted through the plurality of polygonal prisms may be formed using the inner wall 122*b* as a support. Accordingly, when light generated by the light source module 110 is radiated to the housing 120, the light passes through the wall prism 122*a* to be transmitted to the inner wall 122*b*.

The inner wall 122*b* may be made of a metal material and thus may bind electrons. Specifically, within the inner wall 122*b*, electrons may be bound (or confined) by a positive charge of an atomic nucleus and an electric force. Electrons bound to the inner wall 122*b* may be emitted by light with various wavelengths. That is, as light is transmitted, photoelectrons may be emitted. In this case, light transmitted to the inner wall 122*b* may be light dispersed into photons with a variety of energy through the wall prism 122*a*, and thus photoelectric emission can be maximized. That is, the photon absorption efficiency of the inner wall 122*b* may be increased through the wall prism 122*a*, and thus photoelectric emission can be maximized. In this case, since the light itself emitted from the light source module 110 is composed of photons with a variety of energy, an energy level of photoelectrons generated in the interior space 121 may also vary.

According to an additional embodiment, the inner wall 122*b* may be made of an aluminum (Al) material. When the inner wall 122*b* is made of an aluminum material, photoelectronic emission efficiency can be further improved. Specifically, metals have their own unique work function W and limit frequency (or threshold frequency). Here, the work function and the limit frequency may respectively mean the minimum energy and frequency of light that causes electrons bound to metal to be emitted. Aluminum has a work function of 4.06 eV to 4.26 eV, which may be lower than those of other metals. That is, when the inner wall 122*b* is made of an aluminum material, since the inner wall 122*b* has a low work function, the minimum energy of light for emitting photoelectrons may be reduced, and thus photoelectrons may be emitted through less light energy.

In addition, according to embodiments, a work function may also be important in thermionic emission. Thermionic emission may mean that charge carriers flow from the surface over a potential energy barrier by heat. Unlike a photoelectric effect, in thermionic emission, electrons may be emitted using heat instead of photons. Specifically, according to Richardson' law, the following equation holds:

$$J = AT^2 e^{\frac{-W}{KT}}.$$

Here, J may be a current density, T may be an absolute temperature, W may be a work function, K may be a Boltzmann constant, and A may be a Richardson constant. In other words, as a work function, which is energy that binds electrons, becomes lower, thermionic emission efficiency can be improved. Since aluminum has a work function of 4.06 eV to 4.26 eV, which is lower than that of other metals, heat energy required to emit thermoelectrons may be minimized, which makes it possible to emit thermoelectrons through relatively less heat energy.

In other words, when the inner wall 122*b* is made of an aluminum material, photoelectronic emission and thermoionic emission efficiencies can be improved. Improvements in photoelectronic emission and thermoionic emission efficiencies may ultimately contribute to an improvement in efficiency of generating ultra-microlight.

According to one embodiment of the present invention, the ultra-microlight transmission device 100 may include the first filter unit 130. The first filter unit 130 may uniformly convert spectroscopic and diffusely reflected light into monochromatic light to transmit the monochromatic light to the second filter unit 141.

More specifically, the first filter unit 130 may be made of an acrylic material. For example, the first filter unit 130 may have an outer diameter corresponding to an inner diameter of the housing 120, and may have a thickness of 1 mm to 5 mm.

The first filter unit 130 may be provided to be connected to one end of the housing 120 and may receive light from the interior space 121 of the housing 120. The light received from the interior space 121 may be light that is spectroscopic and diffusely reflected through the wall prism 122*a* of the housing 120 (that is, light in which photoelectric emission or thermionic emission is performed). Spectroscopic and diffusely reflected light has different white light characteristics according to the intensity and wavelength characteristics of light and thus may exhibit non-uniform color distribution characteristics. Accordingly, the first filter unit 130 may convert the spectroscopic and diffusely reflected light into uniform monochromatic light. For example, the first filter unit 130 may convert the spectroscopic and diffusely reflected light (that is, photoelectrons) into monochromatic light such as blue frequency energy. The first filter unit 130 may function as a color correction filter for light.

That is, light spectroscopic and diffusely reflected in the wall prism 122*a* of the housing 120 may be converted into uniform monochromatic light while passing through the first filter unit 130 and transmitted to the second filter unit 141 positioned in one direction (for example, a downward direction in FIG. 2) of the first filter unit 130. Through the role of the color correction filter of the first filter unit 130, light with various characteristics may be converted into uniform light with the same characteristics.

According to one embodiment of the present invention, the ultra-microlight transmission device 100 may include the second filter unit 141 provided by stacking a plurality of prism discs. In addition, the ultra-microlight transmission device 100 may include the third filter unit 142 that filters light transmitted from the second filter unit 141.

In one embodiment, the second filter unit 141 may adjust light converted through continuous diffraction and interference through the plurality of prism discs (that is, light passing through the first filter unit). Specifically, as shown in FIG. 2, the second filter unit 141 may be implemented by stacking the plurality of prism discs.

The second filter unit 141 may be provided in contact with a side of the first filter unit 130 in one direction (for example, a downward direction) and provided in a form in which the plurality of prism discs are stacked. Converted light passing through the first filter unit 130 may be subjected to continuous diffraction and interference while passing through each layer of the second filter unit 141 and thus may be adjusted. Adjusting the converted light may mean that light is adjusted to have an optimal wavelength range, for example, so as to improve cell proliferation efficiency in living creatures. For a specific example, light may be adjusted by passing through the second filter unit 141 and thus may have a wavelength of 300 nm to 870 nm. Here, light with a wavelength of 300 nm to 870 nm may be appropriate light for increasing cell proliferation efficiency (for example, improving reproductive potential) of living creatures. According to one embodiment, the second filter unit 141 may adjust light to have various wavelengths according to an aspect of the provision of the plurality of prism discs. That is, while passing through each layer (that is, the plurality of prism discs, through continuous diffraction and interference, light passing through the second filter unit 141 may be adjusted to have an appropriate wavelength to provide cell proliferation efficiency to living creatures.

In one embodiment, the third filter unit 142 may be made of a black body acrylic material. The black body acrylic material may function as a filter through which only light with a specific range of intensity passes. That is, the third filter unit 142 may allow only light with a certain range of intensity to be emitted to the outside through the black body acrylic material.

Specifically, the third filter unit 142 may emit ultra-microlight to the outside by filtering light with predetermined intensity among light transmitted from the second filter unit 141. Here, the predetermined intensity may refer to a range of light related to the optimal intensity for improving cell proliferation efficiency of living creatures. For example, light (that is, ultra-microlight) emitted through the third filter unit 142 may have an intensity of $10^{-18}$ W/cm$^2$ to $10^{-15}$ W/cm$^2$. In other words, light with an intensity of $10^{-18}$ W/cm$^2$ to $10^{-15}$ W/cm$^2$ may be light with optimal intensity for increasing cell proliferation efficiency of living creatures. For example, when light outside a range of $10^{-18}$ W/cm$^2$ to $10^{-15}$ W/cm$^2$ (for example, light with an intensity of $10^{-11}$ W/cm$^2$) is radiated onto living creatures, the light may not be appropriate light (that is, ultra-microlight) that increases cell proliferation efficiency of living creatures.

That is, the third filter unit 142 may filter light (for example, light in a specific wavelength band) passing through the second filter unit 141 such that only light with specific intensity is emitted to the outside. Accordingly, the light emitted to the outside may be ultra-microlight which is light with optimal intensity for increasing cell proliferation efficiency of living creatures.

According to one embodiment, light generated by the light source module 110 may sequentially pass through the interior space 121, the first filter unit 130, the second filter unit 141, and the third filter unit 142 to be emitted to the outside.

In summary, as shown in FIG. 2, the heat radiation member 150 transfers (or diffuses) heat, which is generated in a process in which the light source module 110 generates light, to the interior space 121 of the housing 120, thereby maximizing thermionic emission efficiency in the interior space 121.

In addition, light emitted from the light source module 110 is spectroscopic and diffusely reflected through the wall prism 122*a*, thereby maximizing photoelectric emission efficiency. Additionally, light emitted from the light source module 110 to the interior space 121 may not be simple light, but may be light amplified in relation to secondary electrons (that is, including a large amount of photons), thereby further maximizing photoelectric emission.

Light related to photoelectric emission and thermionic emission passes through the first filter unit 130, and in such a process, the spectroscopic and diffusely reflected light can be uniformly converted into monochromatic light. While passing through the second filter unit 141 provided to include the plurality of prism discs, through continuous diffraction and interference, light converted into uniform monochromatic light after passing through the first filter unit 130 may be adjusted to have a specific wavelength range to be transmitted to the third filter unit 142. The third filter unit 142 may emit only light (that is, ultra-microlight), which has a certain level or more of energy intensity among light transmitted from the second filter unit 141, to the outside of the ultra-microlight transmission device 100.

That is, ultra-microlight that increases cell proliferation efficiency in living creatures may be generated and emitted to the outside. Here, the ultra-microlight may be light converted and adjusted to have an optimal wavelength and intensity range for increasing cell proliferation efficiency of living creatures while passing through the second filter unit 141 and the third filter unit 142.

In addition, in a process of generating ultra-microlight, the heat radiation member 150 may transfer heat to the interior space 121 to maximize thermionic emission efficiency, thereby improving the efficiency of generating ultra-microlight. In addition, in a process of generating bioenergy light, photoelectric emission efficiency can be improved through the wall prism 122*a*. Additionally, since light generated by the light source module 110 is light amplified in relation to secondary electrons (that is, including a large amount of photons), in a process in which the wall prism 122*a* emits photoelectrons, photoelectric emission efficiency can be maximized. Thus, the efficiency of generating ultra-microlight can be improved.

That is, the ultra-microlight transmission device 100 of the present invention can generate ultra-microlight with optimal efficiency through structural features that maximize photoelectronic emission and thermionic emission.

Figure 8:
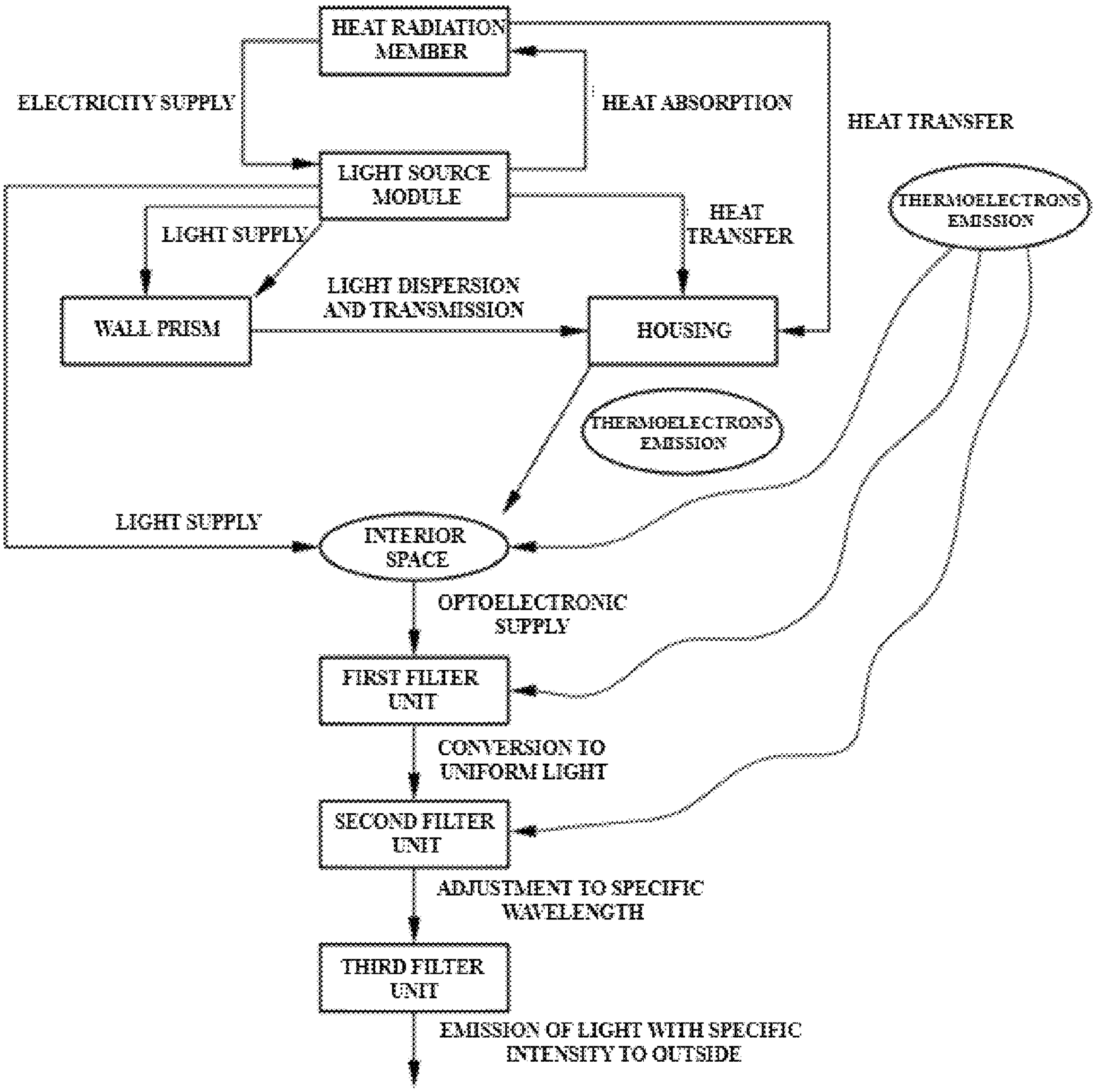
FIG. 8 is an exemplary diagram illustrating a light movement process in an ultra-microlight transmission device according to one embodiment of the present invention.

In summary, as shown in FIG. 8, the heat radiation member 150 transfers (or diffuses) heat, which is generated in a process in which the light source module 110 generates light, to the interior space 121 of the housing 120, thereby maximizing thermionic emission efficiency in the interior space 121.

In addition, light emitted from the light source module 110 is spectroscopic and diffusely reflected through the wall prism 122*a*, thereby maximizing photoelectric emission efficiency. Additionally, light emitted from the light source module 110 to the interior space 121 may not be simple light, but may be light amplified in relation to secondary electrons (that is, including a large amount of photons), thereby further maximizing photoelectric emission.

Light related to photoelectron and thermionic emission passes through the first filter unit 130, and in such a process, spectroscopic and diffusely reflected light can be uniformly converted into monochromatic light. While passing through the second filter unit 141 provided to include the plurality of prism discs, through continuous diffraction and interference, light converted into uniform monochromatic light after passing through the first filter unit 130 may be adjusted to have a specific wavelength range to be transmitted to the third filter unit 142. The third filter unit 142 may emit only light (that is, ultra-microlight), which has a certain level or more of energy intensity among light transmitted from the second filter unit 141, to the outside of the ultra-microlight transmission device 100.

That is, ultra-microlight that increases cell proliferation efficiency in living creatures may be generated and emitted to the outside. Here, the ultra-microlight may be light converted and adjusted to have an optimal wavelength and intensity range for increasing cell proliferation efficiency of living creatures while passing through the second filter unit 141 and the third filter unit 142.

In addition, in a process of generating ultra-microlight, the heat radiation member 150 may transfer heat to the interior space 121 to maximize thermionic emission efficiency, thereby improving the efficiency of generating ultra-microlight. In addition, in a process of generating bioenergy light, photoelectric emission efficiency can be improved through the wall prism 122*a*. Additionally, since light generated by the light source module 110 is light amplified in relation to secondary electrons (that is, including a large amount of photons), in a process in which the wall prism 122*a* emits photoelectrons, photoelectric emission efficiency can be maximized. Thus, the efficiency of generating ultra-microlight can be improved.

That is, the ultra-microlight transmission device 100 of the present invention can generate ultra-microlight with optimal efficiency through structural features that maximize photoelectronic emission and thermionic emission.

Figure 9:
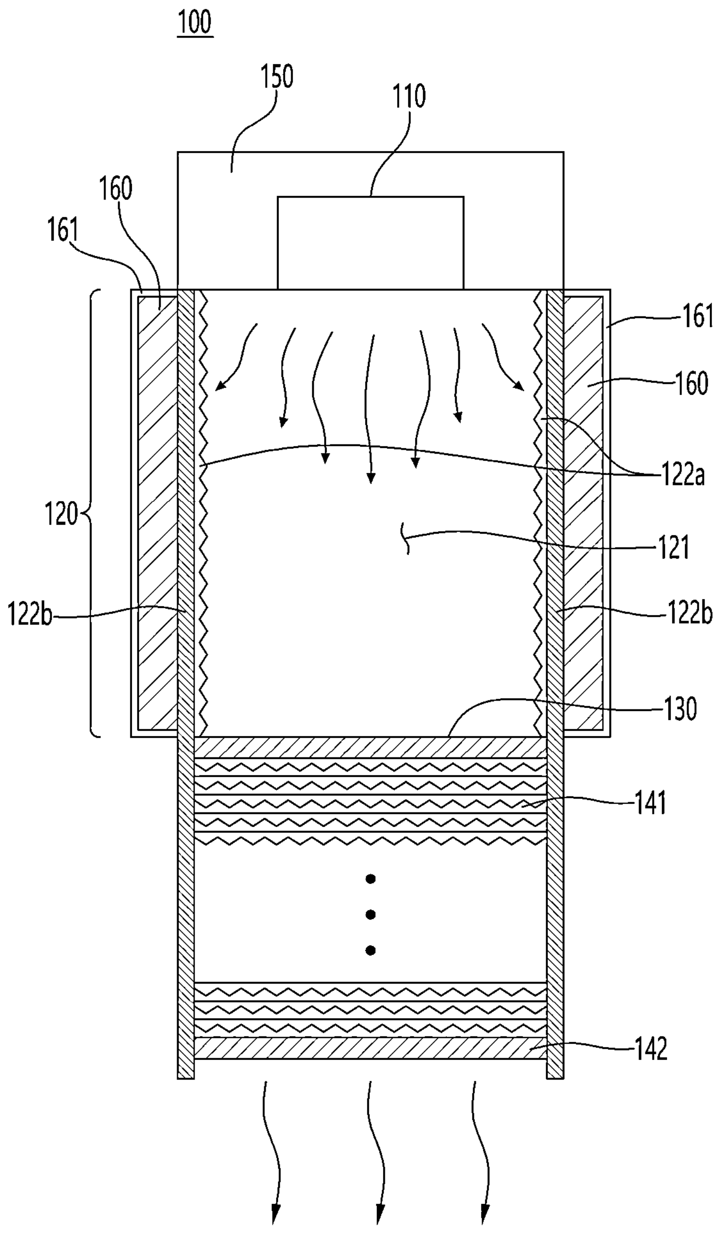
FIG. 9 is an exemplary cross-sectional view of an ultra-microlight transmission device including an electromagnetic wave generator according to one embodiment of the present invention.

According to one embodiment of the present invention, the ultra-microlight transmission device 100 may include an electromagnetic wave generator 160. As shown in FIG. 9, the electromagnetic wave generator 160 may be provided to surround an outer surface of the housing 120. The electromagnetic wave generator 160 may be made of a material that generates electromagnetic waves. For example, the electromagnetic wave generator 160 may be made of amphibole that generates electromagnetic waves. In addition, the ultra-microlight transmission device 100 may include a blocking film 161. The blocking film 161 may be used to control one-directional movement of electromagnetic waves. As shown in FIG. 9, the blocking film 161 may be provided to surround an outer surface of the electromagnetic wave generator 160. The blocking film 161 may be for shielding electric fields, magnetic fields, or electromagnetic waves occurring in a direction from inside to outside and made of a metal material such as aluminum (AL) or copper (Cu). When the blocking film 161 is made of a metal material, electromagnetic waves may be reflected from a surface, and an electric field becomes 0 due to the movement of free electrons in a conductor, thereby blocking electromagnetic waves and electric fields in a wide frequency band. The specific description of the materials constituting the above-described blocking film is merely an example, and the present invention is not limited thereto.

That is, the ultra-microlight transmission device 100 may include the electromagnetic wave generator 160 that generates electromagnetic waves between the outer surface of the housing 120 and the blocking film 161, and a photoelectric effect occurring in the interior space 121 of the housing 120 can be improved through the electromagnetic waves generated by the electromagnetic wave generator 160. That is, photoelectronic emission efficiency can be maximized by electromagnetic waves. In this case, the blocking film 161 may perform control such that electromagnetic waves generated by the electromagnetic wave generator 160 are not emitted outward. Accordingly, electromagnetic waves are concentrated to the interior space 121, thereby further maximizing a photoelectric effect. In addition, emitted electromagnetic waves are minimized such that an electromagnetic field generated internally do not affect the outside, thereby reducing harmfulness to contribute to an improvement in stability of living creatures.

According to one embodiment of the present invention, the ultra-microlight transmission device 100 may include a metal plate 170. The metal plate 170 will be described in more detail below with reference to FIG. 10.

Figure 10:
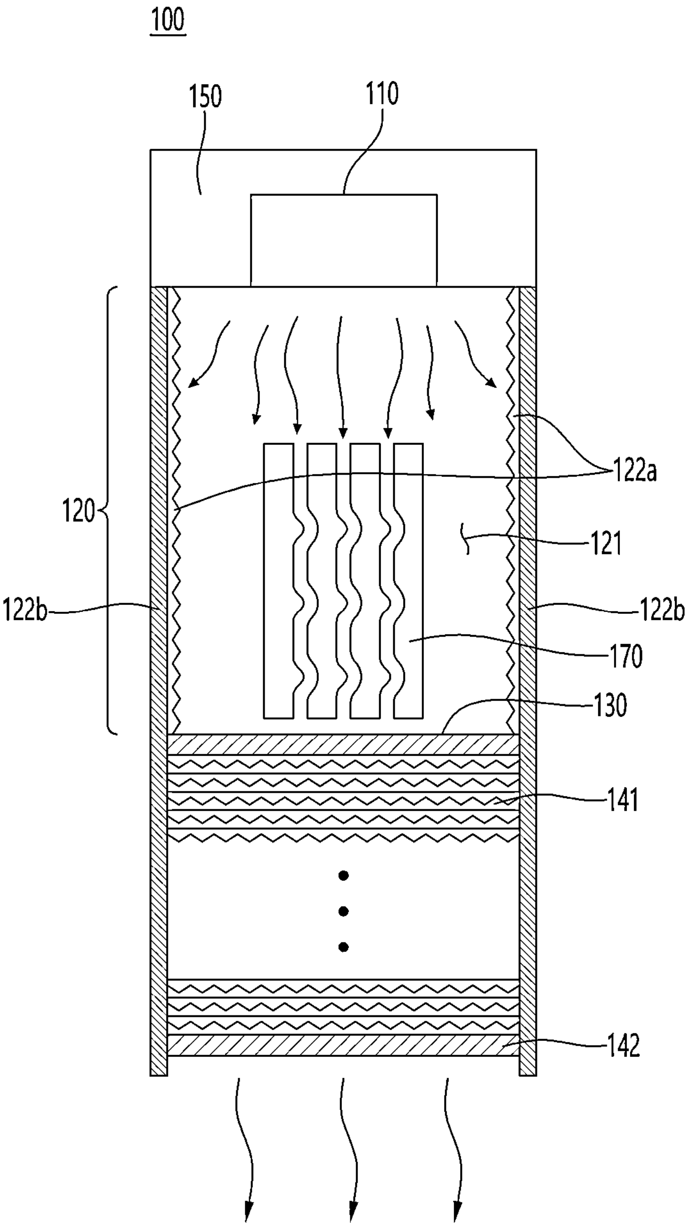
FIG. 10 is an exemplary cross-sectional view of an ultra-microlight transmission device including a metal plate according to one embodiment of the present invention.

According to one embodiment, as shown in FIG. 10, the metal plate 170 may be provided in one area of the interior space 121 of the housing 120. The metal plate 170 may be made of a metal that binds electrons by a positive charge of an atomic nucleus and an electric force. In the metal plate 170, electrons bound within atoms by light may collide with light to be emitted to the outside of metal. That is, additional metal (that is, the metal plate) may be provided in the interior space 121 in addition to the third filter unit 142, a surface area of the metal capable of emitting photoelectrons is maximized, thereby increasing photoelectronic emission efficiency in the interior space 121. In other words, an area for a photoelectric effect can be improved through the metal plate 170, thereby increasing photoelectronic emission efficiency. According to one embodiment, the metal plate 170 may be made of an aluminum (Al) material. When the metal plate 170 is made of an aluminum material, photoelectronic emission efficiency can be further improved. Specifically, metals have their own unique work function W and limit frequency (or threshold frequency). Here, the work function and the limit frequency may respectively mean the minimum energy and frequency of light that causes electrons bound to metal to be emitted. Aluminum has a work function of 4.06 eV to 4.26 eV, which may be lower than those of other metals. That is, when the metal plate 170 is made of an aluminum material, since the metal plate 170 has a low work function, the minimum energy of light for emitting photoelectrons may be reduced, and thus photoelectrons may be emitted through less light energy. In addition, when the metal plate 170 is made of an aluminum material, thermionic emission efficiency can also be maximized.

In other words, when the metal plate 170 is made of an aluminum material, photoelectronic emission and thermoionic emission efficiencies can be improved. Improvements in photoelectronic emission and thermoionic emission efficiencies may ultimately contribute to an improvement in efficiency of generating ultra-microlight.

Figure 11:
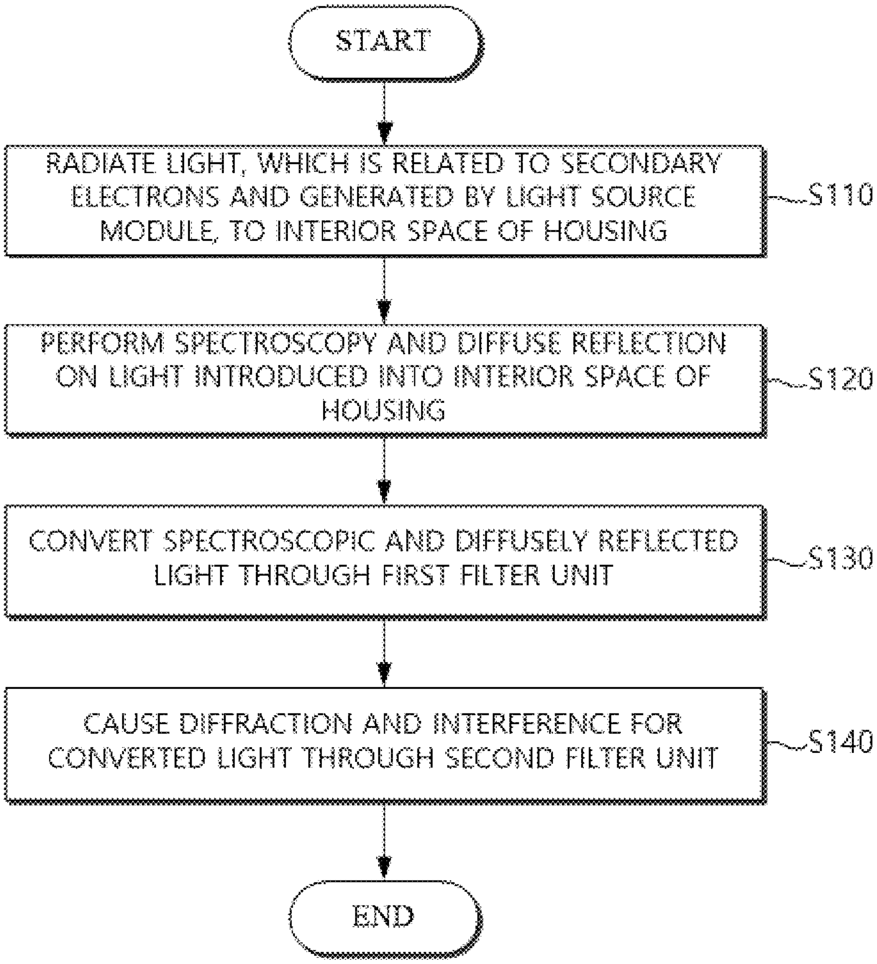
FIG. 11 is a flowchart illustrating a method of generating light energy according to one embodiment of the present invention.

FIG. 11 is a flowchart illustrating a method of generating light energy according to one embodiment of the present invention. According to one embodiment, the method of generating light energy that provides a cell proliferation effect may consist of the following operations. The order of the operations shown in FIG. 11 may be changed as needed, and at least one operation may be omitted or added. That is, the above-described operations are merely one embodiment of the present invention, and the scope of the present invention is not limited thereto.

According to one embodiment of the present invention, the method of generating light energy that provides a cell proliferation effect may include operation S110 of radiating light, which is related to secondary electrons and generated by the light source module 110, to the interior space 121 of the housing 120.

The light source module 110 may generate light related to infrared light, visible light, ultraviolet light, or the like. The light source module 110 may generate amplified light through secondary electron emission. This light source module 110 may be disposed in one direction of the housing 120 and may transmit amplified light to the housing 120.

According to one embodiment, the light source module 110 may generate light related to infrared light, visible light, ultraviolet light, or the like. The light source module 110 may generate amplified light through secondary electron emission. The light source module 110 may be disposed in one direction of the housing 120 and may transmit amplified light to the housing 120.

According to one embodiment, the light source module 110 may include the photoelectric surface 112 that emits primary electrons based on light or voltage application, the electron amplification unit 114 that amplifies the primary electrons to emit secondary electrons, and the light source housing 110*a* including the photoelectric surface 112 and the electron amplification unit 114.

Referring to FIG. 3, the light source module 110 may include the light inlet 111 that allows light to be introduced into the photoelectric surface 112. According to one embodiment, the light source module 110 may include the light source housing 110*a*, and the light inlet 111 may be formed in a portion of the light source housing 110*a*. The light inlet 111 may be provided in a shape of a hole with a predetermined diameter on one upper surface of the light source housing 110*a*. In an embodiment, light may be input through the light inlet 111, and the light input through the light inlet 111 may be transmitted to the photoelectric surface 112. According to one embodiment, the light source interior space 110*a*-1 of the light source housing 110*a* may be in a vacuum state. In this case, the light source interior space 110*a*-1 may be a space in which the electron amplification unit 114 is provided, and the electron amplification unit 114 may serve to amplify electrons. According to an embodiment, when the light source interior space 110*a*-1 is in a vacuum state, electron amplification efficiency can be improved.

According to one embodiment, the light source module 110 may include the first voltage generator 113 and the photoelectric surface 112. The first voltage generator 113 and the photoelectric surface 112 may be provided inside the light source housing 110*a*. The first voltage generator 113 may apply a voltage to the photoelectric surface 112. The photoelectric surface 112 may emit electrons or photons based on the voltage applied from the first voltage generator 113. In an embodiment, the photoelectric surface 112 may be positioned at the lower end of the light inlet 111, may receive light input through the light inlet 111, and may emit electrons or photons (for example, primary electrons) based on the voltage applied through the first voltage generator 113 and the input light. According to one embodiment, the photoelectric surface 112 may emit electrons based on the applied voltage. Here, the applied voltage may be the voltage applied from the first voltage generator 113. In one embodiment, the photoelectric surface 112 may determine an amount of emission of electrons based on a magnitude of the voltage applied from the first voltage generator 113. For example, as a higher voltage is applied from the first voltage generator 113, an amount of electrons generated by the photoelectric surface 112 may increase. In other words, an amount of electrons generated through the light source module 110 or an amount of light generated based on the electrons may be based on the voltage applied through the first voltage generator 113.

More specifically, the photoelectric surface 112 may receive light through the light inlet 111 positioned thereon and may generate electrons and photons based on the received light and the voltage applied from the first voltage generator 113. In an embodiment, the photoelectric surface. 112 may include the fluorescent layer, and electrons emitted through voltage application may collide with the fluorescent layer to generate photons. In other words, the photoelectric surface 112 may emit primary electrons based on light introduced through the light inlet 111 and the voltage applied from the first voltage generator 113.

According to one embodiment of the present invention, the light source module 110 may include the electron amplification unit 114 that amplifies electrons, and the second voltage generator 115 that applies a voltage to the electron amplification unit 114. Referring to FIG. 4, the electron amplification unit 114 may be positioned below the photoelectric surface 112 and may amplify primary electrons emitted through the photoelectric surface 112 to emit secondary electrons. Specifically, the second voltage generator 115 may supply a voltage in contact with each of one end of the photoelectric surface 112 and the other end corresponding to the one end. A potential difference may be generated between both ends of the electron amplification unit 114 by the voltage of the second voltage generator 115, and thus electrons or photons (that is, primary electrons) move in one direction. More specifically, referring to FIG. 4, the primary electrons emitted through the photoelectric surface 112 move from one direction (for example, a left direction in the drawing) to another direction (for example, a right direction in the drawing) by a potential difference caused through the second voltage generator 115. That is, the second voltage generator 115 may generate a potential difference to cause movement of primary electrons. While moving in one direction, the primary electrons may be amplified by the electron amplification unit 114, and thus, secondary electrons may be generated.

In an embodiment, the electron amplification unit 114 may be constituted through an arrangement between the plurality of prisms. Specifically, as shown in FIGS. 3 and 5, the electron amplification unit 114 may be formed by regularly arranging the plurality of prisms. Accordingly, when primary electrons move in one direction between the plurality of prisms, the primary electrons may continuously collide with each of the prisms to be amplified, thereby generating secondary electrons. That is, the secondary electrons may mean that an amount of electrons is considerably increased as compared to the primary electrons.

According to one embodiment, each of the plurality of prisms included in the electron amplification unit 114 may include the plurality of protrusions that protrude in a direction that is not parallel to an arrangement direction. For example, each of the plurality of prisms constituting the electron amplification unit 114 may include the plurality of protrusions that protrude in a direction perpendicular to the arrangement direction of each prism. For a more specific example, as shown in FIG. 5, the plurality of prisms may include the first prism 114-1 and the second prism 114-2, and the first prism 114-1 and the second prism 114-2 may include the plurality of first protrusions 114-1*a* and the plurality of second protrusions 114-2*a*, respectively.

In an embodiment, the plurality of prisms may be arranged such that the protrusions formed on each of the plurality of prisms are disposed to be misaligned with each other. For example, the plurality of first protrusions 114-1*a* formed on the first prism 114-1 may be disposed to be misaligned with each other, and the plurality of second protrusions 114-2*a* formed on the second prism 114-2*a* may be disposed to be misaligned with each other. When the protrusions formed on each prism are arranged to be misaligned with each other, the number of collisions between each of the prisms and primary electrons may be considerably increased while the primary electrons move in one direction between the plurality of prisms. In addition, the protrusions formed on each prism may prevent electrons from returning in a reverse direction. In other words, it is possible to prevent primary electrons from being transmitted through the protrusion in a direction different from an intended direction and simultaneously increase the number of collisions, thereby maximizing an amount of amplification of the primary electrons, that is, an amount of generation (or emission) of secondary electrons.

That is, the light source module 110 may generate photons related to light amplified through secondary electron emission to transmit the generated photons to the interior space 121 of the housing. In this case, through light (or photons) generated and transmitted by the light source module 110, a small amount of electrons (that is, primary electrons) emitted by the photoelectric surface 112 may be amplified in the electron amplification unit 114 to emit a large amount of electrons (for example, secondary electrons), thereby further maximizing light use efficiency. Accordingly, photoelectric emission efficiency can be maximized in a process of generating ultra-microlight using light, which will be described below, and as a result, the efficiency of generating ultra-microlight can be improved. According to one embodiment of the present invention, the method of generating light energy that provides a cell proliferation effect may include operation S120 of performing spectroscopy and diffuse reflection on light introduced into the interior space 121 of the housing 120.

According to an embodiment, the housing 120 may include the wall prism 122*a*. The wall prism 122*a* may be made of an acrylic material and may be formed in a shape of a figure on a plane that is not parallel to the side surface of the housing 120. That is, the wall prism 122*a* may include the plurality of polygonal prisms protruding inward from the side wall of the housing 120 in a shape in which at least one pair of faces are not parallel. For example, the plurality of polygonal prisms may be provided in a triangular pris shape. However, the shape of the plurality of polygonal prisms constituting the wall prism is not limited thereto and may be implemented through various shapes such as a polygonal prism shape, a polygonal pyramid shape, a cone shape, and a spherical shape.

The plurality of polygonal prisms constituting the wall prism 122*a* may have various sizes ranging from several nanometers to several millimeters. When light radiated from the light source module 110 is incident on the wall prism 122*a* (that is, each of the plurality of polygonal prisms), a degree of refraction varies according to a wavelength or frequency, which may cause dispersion. In other words, light is dispersed for each wavelength (for example, each energy level) through the wall prism 122*a*.

In addition, the housing 120 may include the inner wall 122*b* that supports the wall prism 122*a* and is made of a metal material. According to one embodiment, the inner wall 122*b* may be made of a stainless steel material. As shown in FIG. 2, the inner wall 122*b* may be formed adjacent to the inner surface of the housing 120 having a cylindrical shape, and the wall prism 122*a* constituted through the plurality of polygonal prisms may be formed using the inner wall 122*b* as a support. Accordingly, when light generated by the light source module 110 is radiated to the housing 120, the light passes through the wall prism 122*a* to be transmitted to the inner wall 122*b*.

The inner wall 122*b* may be made of a metal material and thus may bind electrons. Specifically, within the inner wall 122*b*, electrons may be bound (or confined) by a positive charge of an atomic nucleus and an electric force. Electrons bound to the inner wall 122*b* may be emitted by light with various wavelengths. That is, as light is transmitted, photoelectrons may be emitted. In this case, light transmitted to the inner wall 122*b* may be light dispersed into photons with a variety of energy through the wall prism 122*a*, and thus photoelectric emission can be maximized. That is, the photon absorption efficiency of the inner wall 122*b* may be increased through the wall prism 122*a*, and thus photoelectric emission can be maximized. In this case, since the light itself emitted from the light source module 110 is composed of photons with a variety of energy, an energy level of photoelectrons generated in the interior space 121 may also vary.

According to one embodiment of the present invention, the method of generating light energy that provides a cell proliferation effect may include operation S130 of converting the spectroscopic and diffusely reflected light into monochromatic light through the first filter unit 130.

The first filter unit 130 may be connected to one end of the housing 120 and may receive light from the interior space 121 of the housing 120. The light received from the interior space 121 may be light that is spectroscopic and diffusely reflected through the wall prism 122*a* and the inner wall 122*b* of the housing 120 (that is, light in which photoelectric emission or thermionic emission is performed). Spectroscopic and diffusely reflected light has different white light characteristics according to the intensity and wavelength characteristics of light and thus may exhibit non-uniform color distribution characteristics. Accordingly, the first filter unit 130 may convert the spectroscopic and diffusely reflected light into uniform monochromatic light. For example, the first filter unit 130 may convert the spectroscopic and diffusely reflected light (that is, photoelectrons) into monochromatic light such as blue frequency energy. The first filter unit 130 may function as a color correction filter for light.

That is, light spectroscopic and diffusely reflected in the wall prism 122*a* of the housing 120 may be converted into uniform monochromatic light while passing through the first filter unit 130 and transmitted the second filter unit 141 positioned in one direction of the first filter unit 130. Through the role of the color correction filter of the first filter unit 130, light with various characteristics may be converted into uniform light with the same characteristics.

According to one embodiment of the present invention, the method of generating light energy that provides a cell proliferation effect may include operation S140 of causing diffraction and interference for the light converted through the second filter unit 141.

In one embodiment, the second filter unit 141 may adjust light converted through continuous diffraction and interference through the plurality of prism discs (that is, light passing through the first filter unit). Specifically, as shown in FIG. 2, the second filter unit 141 may be implemented by stacking the plurality of prism discs.

The second filter unit 141 may be provided in contact with a side of the first filter unit 130 in one direction (for example, a downward direction) and provided in a form in which the plurality of prism discs are stacked. Converted light passing through the first filter unit 130 may be subjected to continuous diffraction and interference while passing through each layer of the second filter unit 141 and thus may be adjusted. Adjusting the converted light may mean that light is adjusted to have an optimal wavelength range, for example, so as to improve cell proliferation efficiency in living creatures. For a specific example, light may be adjusted by passing through the second filter unit 141 and thus may have a wavelength of 300 nm to 870 nm. Here, light with a wavelength of 300 nm to 870 nm may be appropriate light for increasing cell proliferation efficiency (for example, improving reproductive potential) of living creatures. According to one embodiment, the second filter unit 141 may adjust light to have various wavelengths according to an aspect of the provision of the plurality of prism discs. That is, while passing through each layer (that is, the plurality of prism discs, through continuous diffraction and interference, light passing through the second filter unit 141 may be adjusted to have an appropriate wavelength to provide cell proliferation efficiency to living creatures.

In one embodiment, the third filter unit 142 may be made of a black body acrylic material. The black body acrylic material may function as a filter through which only light with a specific range of intensity passes. That is, the third filter unit 142 may allow only light with a certain range of intensity to be emitted to the outside through the black body acrylic material.

That is, the third filter unit 142 may filter light (for example, light in a specific wavelength band) passing through the second filter unit 141 such that only light with specific intensity is emitted to the outside. Accordingly, the light emitted to the outside may be ultra-microlight which is light with optimal intensity for increasing cell proliferation efficiency of living creatures.

Meanwhile, it can be confirmed through the following experimental process and results that an antibody production function of mammals administered the vaccine is improved through ultra-microlight according to one embodiment of the present invention. Through the following experiments, the effects of ultra-microlight on the growth performance, immune system, and metabolism of mammals could be confirmed. The experiment was conducted using a PED-X® vaccine of CAVC. PED-X® is a vaccine against porcine epidemic diarrhea (PED) virus type 2b which is currently circulating outdoors. PED-X® may amplify an immunoglobulin A (IgA) antibody and sustain the formation thereof. The vaccine used in the experiment was PED-X®, but similar results could be obtained in experiments using other vaccines (for example, SuiShot CSFV Marker-L, SuiShot CSFM-B, APM-X, and AR-X).

In an embodiment, an experiment was performed on an experimental group (that is, an experimental group radiated with ultra-microlight) and a control group which were formed through a total of 30 pigs that had an average initial body weight (BW) of 7.06±0.11 kg and were 21 days old.

The experiment was performed in a metal cage with a plastic floor (1.2 m×2.4 m), an average temperature of the cage was maintained in a range of 25° C. to 30° C., and humidity was maintained in a range of 61% to 66%.

The experiment was performed for 48 days, and after vaccine administration, values measured from each of the experimental and control groups were recorded on each of days 14, 24, and 48. Here, the experimental group refers to pigs that were radiated with ultra-microlight of the present invention for at least 2 hours a day.

In this case, the intensity of the ultra-microlight was too weak to be measured using a spectrometer, and thus an intensity value was measured as a value measured 2 cm in front of an end surface of a light radiation device. Meanwhile, since the intensity of light is attenuated in inverse proportion to (distance) 2, when installed in an actual pig pen, the light radiation device is installed at a circle having a radius of about 2 m to 5 m from a mammal. It was confirmed that the final intensity of the light source was in a range of $10^{-18}$ W/cm$^2$ to $10^{-15}$ W/cm$^2$.

TABLE 1

| Growth capability | | | |
|---|---|---|---|
| Item | Control group | Experimental group | P-value |
| Initial BW (kg) | 7.07 | 7.05 | 0.992 |
| Final BW (kg) | 31.7 | 34.17 | 0.08 |
| d 14 | | | |
| ADG (g) | 371 | 395 | 0.204 |
| ADFI (g) | 512 | 522 | 0.447 |
| G:F | 0.725 | 0.756 | 0.27 |
| d 28 | | | |
| ADG (g) | 455 | 521 | 0.065 |
| ADFI (g) | 679 | 736 | 0.121 |

TABLE 1-continued

| Growth capability | | | |
|---|---|---|---|
| Item | Control group | Experimental group | P-value |
| G:F | $0.67^{b}$ | $0.71^{a}$ | 0.039 |
| d 48 | | | |
| ADG (g) | 653 | 715 | 0.178 |
| ADFI (g) | 1,145 | 1,181 | 0.622 |
| G:F | $0.57^{b}$ | $0.61^{a}$ | 0.018 |
| Overall | | | |
| ADG (g) | 513 | 565 | 0.088 |
| ADFI (g) | 825 | 859 | 0.28 |
| G:F | 0.62 | 0.66 | 0.113 |

Looking at [Table 1], it could be confirmed that the experimental group irradiated with ultra-microlight gained more weight than the initial BW as compared to the control group that was not radiated with ultra-microlight. Specifically, in the experimental group (that was radiated with ultra-microlight), an average initial BW of 15 pigs was 7.07 kg, but after 48 days, the BW was 34.17 kg, which was increased by 27.1 kg. In the control group (that was not radiated with ultra-microlight), an average initial BW of 15 pigs was 7.07 kg, but it could be confirmed that, after 48 days, the weight was 31.7 kg, which was increased by 24.63 kg. That is, it could be confirmed that the experimental group radiated with ultra-microlight gained 2.47 kg as compared to the control group radiated with ultra-microlight. In particular, it could be confirmed that measured values of average daily feed intake (ADFI) and average daily gain (ADG) in the experimental group were higher than those in the control group on all days 14, 24, and 48. In addition, in the case of the experimental group, it can be seen that a gain to feed ratio (G:F) is consistently higher than that of the control group, and it can be confirmed that a P-value (reliability value of corresponding information) thereof is 0.05 or less, which is very reliable information.

That is, as in the above-described experimental results, in the case of the pigs radiated with ultra-microlight, the ADFI, the ADG, and the G:F considerably increased as compared to the pigs not radiated with light, and it could be confirmed that the total BI gain considerably increased. In other words, it can be confirmed that when ultra-microlight with specific intensity and wavelength is radiated for at least 2 hours a day, the growth performance of mammals is improved.

In addition, blood samples were collected using disposable vacuum tubes without an anticoagulant manufactured by Becton, Dickinson and Company to correspond to the experimental and control groups. Serum samples were centrifuged for 15 minutes and stored at a temperature of −20° C., and then analysis was performed on each sample. A hematology system (Drew Scientific Co. LTD, Oxford, CT) was performed and an ELISA kit was used to obtain measured values of immunoglobulin G (IgG), IgA, IL-1β, TNF-α, and IL-6.

TABLE 2

| Blood analysis | | | |
|---|---|---|---|
| Item | Control group | Experimental group | P-value |
| d 28 | | | |
| IgA (ng/ml) | $8.72^{b}$ | $10.28^{a}$ | 0.001 |
| IgG (ng/ml) | $22.59^{b}$ | $26.12^{a}$ | 0.001 |

TABLE 2-continued

| Blood analysis | | | |
|---|---|---|---|
| Item | Control group | Experimental group | P-value |
| d 48 | | | |
| IgA (ng/ml) | $33.76^{b}$ | $58.41^{a}$ | <0.001 |
| IgG (ng/ml) | $41.56^{b}$ | $45.15^{a}$ | 0.036 |

Immunoglobulin is a glycoprotein molecule produced in an immune response upon stimulation by an antigen and mainly binds specifically to a specific antigen in the blood to cause an antigen-antibody reaction. In an embodiment, the immunoglobulin is also referred to as an antibody and is produced from B lymphocytes to perform a function of removing antigens from pathogenic microorganisms such as bacteria and viruses through precipitation or an agglutination reaction. In addition, the immunoglobulin induces various immune functions through interactions with other elements of an immune system. In other words, a higher level of the immunoglobulin may mean that an immune function is improved. Referring to [Table 2], it could be confirmed that both IgA and IgG showed high levels in the experimental group radiated with ultra-microlight. That is, it could be confirmed that an immune function of the experimental group radiated with ultra-microlight for at least 2 hours a day for 48 days was considerably improved. In particular, it can be confirmed that the P-value (reliability value of the information) corresponding to each group is than 0.05 or less, which is very reliable information.

According to various embodiments of the present invention, it is possible to provide an ultra-microlight transmission device that generates and provides ultra-microlight with improved cell proliferation efficiency.

| (Description of Reference Numerals in Drawings) | |
|---|---|
| 11: Indoor space | |
| 100: Ultra-microlight transmission device | 110: Light source module |
| 110a: Light source housing | 110a-1: Light source interior space |
| 111a: Light inlet | 112: Photoelectric surface |
| 113: First voltage generator | 114: Electron amplification unit |
| 114-1: First prism | 114-2: Second prism |
| 114-1a: Multiple first protrusions | 114-2a: Multiple second protrusions |
| 115: Second voltage generator | 116: Light outlet |
| 111a: Power source | 112a: Voltage generation element |
| 113a: Electron emission element | 113a-1: First electron emission element |
| 113a-1a: First substrate | 113a-1b: First emitter |
| 113a-1c: First gate electrode | 113b-1: Second electron emission element |
| 113b-1a: Second substrate | 113b-1b: Second emitter |
| 113b-1c: Electron amplification layer | 113b-1d: Second gate electrode |
| 114a: First photoelectric surface | 120: Housing |
| 121: Interior space | 122a: Wall prism |
| 122b: Inner wall | 130: First filter unit |
| 141: Second filter unit | 142: Third filter unit |
| 150: Heat radiation member | 160: Electromagnetic wave generator |
| 161: Blocking film | 1700: Metal plate |

BEST MODE FOR CARRYING OUT THE INVENTION

In the best mode for carrying out the invention as described above, the relevant details are provided.

INDUSTRIAL APPLICABILITY

The present invention can be utilized in fields aimed at activating the metabolism of living organisms and enhancing immune capabilities.

What is claimed is:

1. An ultra-microlight transmission device using secondary electrons, comprising:

a light source module configured to generate light;

a housing which includes an interior space and performs spectroscopy and diffuse reflection on light introduced into the interior space;

a first filter unit configured to convert the spectroscopic and diffusely reflected light into monochromatic light; and a second filter unit configured to cause diffraction and interference for the converted light, wherein the light source module includes:

a photoelectric surface configured to emit primary electrons based on light or voltage application; and an electron amplification unit configured to amplify the primary electrons to emit secondary electrons.

2. The ultra-microlight transmission device of claim 1, wherein the light source module further includes:

a light source housing including the photoelectric surface and the electron amplification unit.

3. The ultra-microlight transmission device of claim 2, wherein the light source module includes:

a light inlet configured to allow light to be introduced into the photoelectric surface;

a light outlet configured to emit the secondary electrons to an outside;

a first voltage generator configured to apply a voltage to the photoelectric surface; and a second voltage generator configured to generate a potential difference for causing movement of the emitted primary electrons.

4. The ultra-microlight transmission device of claim 2, wherein the electron amplification unit is constituted by arranging a plurality of prisms, and each of the plurality of prisms includes a plurality of protrusions protruding in a direction perpendicular to an arrangement direction.

5. The ultra-microlight transmission device of claim 4, wherein the plurality of prisms are disposed such that the protrusions formed on each of the plurality of prisms are misaligned with each other.

6. The ultra-microlight transmission device of claim 1, further comprising a heat radiation member configured to absorb heat generated by the light source module and transfer the absorbed heat to the housing.

7. The ultra-microlight transmission device of claim 1, wherein the housing includes a wall prism provided inside the interior space and configured to perform spectroscopy and diffuse reflection on the introduced light in multiple directions, and the spectroscopic and diffusely reflected light is radiated to the housing to emit photoelectrons to the interior space.

8. The ultra-microlight transmission device of claim 7, wherein an inner wall of the housing is made of a stainless steel material, and the wall prism is made of an acrylic material and supported on the inner wall.

9. The ultra-microlight transmission device of claim 1, wherein the second filter unit adjusts the converted light by causing continuous diffraction and interference through a plurality of prism discs.

10. The ultra-microlight transmission device of claim 1, further comprising a third filter unit configured to perform filtering on light transmitted from the second filter unit, wherein the third filter unit is made of a black body acrylic plate material and filters light with predetermined energy intensity among the light transmitted from the second filter unit to emit the filtered light to the outside.

11. The ultra-microlight transmission device of claim 1, further comprising:

an electromagnetic wave generator provided to surround an outer surface of the housing and configured to generate electromagnetic waves; and a blocking film provided to surround an outer surface of the electromagnetic wave generator and configured to block one-directional movement of the electromagnetic waves.

12. The ultra-microlight transmission device of claim 1, further comprising a metal plate provided in one area of the interior space of the housing.

13. A method of generating light energy, the method comprising:

radiating light, which is related to secondary electrons and generated by a light source module, to an interior space of a housing;

performing spectroscopy and diffuse reflection on the light introduced into the interior space of the housing;

performing conversion on the spectroscopic and diffusely reflected light through a first filter unit; and causing diffraction and interference for the converted light through a second filter unit, wherein the light source module includes:

a photoelectric surface configured to emit primary electrons based on light or voltage application; and an electron amplification unit configured to amplify the primary electrons to emit secondary electrons.

* * * * *